United States Patent
Behabtu et al.

(10) Patent No.: US 11,505,682 B2
(45) Date of Patent: Nov. 22, 2022

(54) MOLDED ARTICLE COMPRISING POLYSACCHARIDE

(71) Applicant: NUTRITION & BIOSCIENCES USA 4, INC., Rochester, NY (US)

(72) Inventors: Natnael Behabtu, Wilmington, DE (US); Kathleen Opper, Wilmington, DE (US); Marinella Bettine Van Leeuwen, Dodewaard (NL); Geraldus Gerardus Johannes Schennink, Wehl (NL); Karin Molenveld, Wageningen (NL); Christian Peter Lenges, Wilmington, DE (US)

(73) Assignee: NUTRITION & BIOSCIENCES USA 4, INC., Rochester, NY (US)

( * ) Notice: Subject to any disclaimer, the term of this patent is extended or adjusted under 35 U.S.C. 154(b) by 527 days.

(21) Appl. No.: 16/461,165

(22) PCT Filed: Nov. 14, 2017

(86) PCT No.: PCT/US2017/061470
§ 371 (c)(1),
(2) Date: May 15, 2019

(87) PCT Pub. No.: WO2018/093749
PCT Pub. Date: May 24, 2018

(65) Prior Publication Data
US 2020/0062931 A1    Feb. 27, 2020

Related U.S. Application Data

(60) Provisional application No. 62/422,630, filed on Nov. 16, 2016.

(51) Int. Cl.
| | |
|---|---|
| *C08B 37/00* | (2006.01) |
| *B29C 43/00* | (2006.01) |
| *B29K 105/00* | (2006.01) |
| *C08L 3/04* | (2006.01) |
| *C08B 30/18* | (2006.01) |
| *C08B 37/02* | (2006.01) |
| *C08L 5/02* | (2006.01) |

(52) U.S. Cl.
CPC .............. *C08L 3/04* (2013.01); *C08B 30/18* (2013.01); *C08B 37/0018* (2013.01); *C08B 37/0021* (2013.01); *C08L 5/02* (2013.01); *B29C 43/003* (2013.01); *B29K 2005/00* (2013.01); *B29K 2105/0038* (2013.01)

(58) Field of Classification Search
CPC . C08B 37/00; C08B 37/0009; C08B 37/0021; B29C 43/003; B29K 2005/00
See application file for complete search history.

(56) References Cited

U.S. PATENT DOCUMENTS

| | | |
|---|---|---|
| 5,702,942 A | 12/1997 | Leathers et al. |
| 7,000,000 B1 | 2/2006 | O'Brien |
| 8,642,757 B2 | 2/2014 | O'Brien et al. |
| 8,871,474 B2 | 10/2014 | Payne et al. |
| 9,080,195 B2 | 7/2015 | O'Brien et al. |
| 9,139,718 B2 | 9/2015 | Paullin et al. |
| 9,644,322 B2 | 5/2017 | Massouda |
| 11,193,005 B2 | 12/2021 | Behabtu |
| 2006/0127328 A1 | 6/2006 | Monsan et al. |
| 2013/0244287 A1 | 9/2013 | O'Brien et al. |
| 2013/0244288 A1 | 9/2013 | O'Brien et al. |
| 2014/0179913 A1 | 6/2014 | Paullin et al. |
| 2015/0232785 A1 | 8/2015 | Paullin et al. |
| 2016/0122445 A1 | 5/2016 | Nambiar et al. |
| 2016/0230348 A1* | 8/2016 | Massouda ............... C12P 19/04 |

FOREIGN PATENT DOCUMENTS

| | | |
|---|---|---|
| WO | 2003008618 A1 | 1/2003 |
| WO | 2015200589 A1 | 12/2015 |
| WO | 2016106011 A1 | 6/2016 |
| WO | 2016126685 A1 | 8/2016 |
| WO | 2016196022 A1 | 12/2016 |
| WO | 2017003808 A1 | 1/2017 |
| WO | 2017079595 A1 | 5/2017 |

OTHER PUBLICATIONS

De Carvalho et al., Carbohydrate Polymers, 2001, 45, p. 189-194. (Year: 2001).*
Liu et al., Progress in Polymer Science, 2009, 34, p. 1348-1368. (Year: 2009).*
International Preliminary Report on Patentability for PCT/US17/61470 dated May 21, 2019.

* cited by examiner

*Primary Examiner* — Jonathan S Lau

(57) ABSTRACT

Molded articles are disclosed herein, the molded article comprising a polysaccharide, wherein the polysaccharide comprises i) poly alpha-1,3-glucan; ii) poly alpha-1,3-1,6-glucan; iii) a graft copolymer that comprises (A) a backbone comprising dextran with a weight-average molecular weight (Mw) of at least about 100000 Daltons, and (B) poly alpha-1,3-glucan side chains comprising at least about 95% alpha-1,3-glucosidic linkages; or iv) a composition comprising a poly alpha-1,3-glucan ester compound as disclosed herein. Optionally, the molded articles can further comprise a plasticizer and/or starch. The molded articles can be useful as a container, a handle, packaging, a tray, a bottle, a cup, a sheet, a disposable food packaging item, an automotive part, a casing for an electronic device, or a toy.

20 Claims, 3 Drawing Sheets

MOLDED ARTICLE COMPRISING POLYSACCHARIDE

CROSS-REFERENCE TO RELATED APPLICATIONS

This application is the National Stage application of International Application No. PCT/US2017/61470 (filed Nov. 14, 2017), which claims priority to and the benefit of U.S. Provisional Appl. No. 62/422,630, (filed Nov. 16, 2016), both of which prior applications are incorporated herein by reference in their entirety.

FIELD OF THE DISCLOSURE

The present disclosure is directed towards molded articles comprising a polysaccharide. The molded articles can be used in packaging and various other applications.

BACKGROUND

Bioplastics and biobased packaging most commonly use thermoplastic starch. Starch is used in flexible, rigid and foam forms as molded objects. The starch commonly used contains amylose and amylopectin. Starch is typically molded by using plasticizers that disrupt the crystallinity. The recrystallization of starch and further retrogradation of amylose are disadvantages limiting the lifespan and use of such materials. Beyond starch, cellulose is used in a few forms as a bioplastic. Cellulose is unable to be molded without significant processing into fibers or modification.

Driven by a desire to find new structural polysaccharides using enzymatic syntheses or genetic engineering of microorganisms or plant hosts, researchers have discovered polysaccharides that are biodegradable, and that can be made economically from renewable resource-based feedstocks. One such polysaccharide is poly alpha-1,3-glucan, a glucan polymer characterized by having alpha-1,3-glycosidic linkages.

There is a growing need for a renewable packaging, for example molded articles, that can have the desired properties, be made from renewable resources, and also retain good recyclability.

SUMMARY

Disclosed herein are molded articles comprising a polysaccharide. In one embodiment, a molded article comprises:

a polysaccharide, wherein the polysaccharide comprises i) poly alpha-1,3-glucan;

ii) poly alpha-1,3-1,6-glucan;

iii) a graft copolymer that comprises:

(A) a backbone comprising dextran with a weight-average molecular weight (Mw) of at least about 100000 Daltons, and (B) poly alpha-1,3-glucan side chains comprising at least about 95% alpha-1,3-glucosidic linkages; or iv) a composition comprising a poly alpha-1,3-glucan ester compound represented by Structure I:

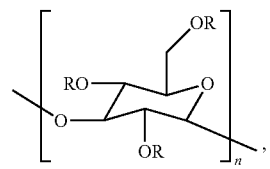

Structure I wherein (A) n is at least 6;

(B) each R is independently an —H or a first group comprising —CO—$C_x$—COOH, wherein the —$C_x$— portion of said first group comprises a chain of 2 to 6 carbon atoms; and (C) the ester compound has a degree of substitution with the first group of about 0.001 to about 1.5.

In an additional embodiment, the polysaccharide comprises poly alpha-1,3-glucan. In another embodiment, the polysaccharide comprises poly alpha-1,3-1,6-glucan. In yet another embodiment, the polysaccharide comprises a graft copolymer that comprises:

(A) a backbone comprising dextran with a weight-average molecular weight (Mw) of at least about 100000 Daltons, and (B) poly alpha-1,3-glucan side chains comprising at least about 95% alpha-1,3-glucosidic linkages. In a further embodiment, the polysaccharide comprises a composition comprising a poly alpha-1,3-glucan ester compound represented by Structure I:

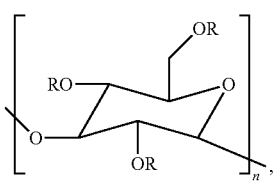

Structure I wherein (a) n is at least 6;

(b) each R is independently an —H or a first group comprising —CO—$C_x$—COOH, wherein the —$C_x$— portion of said first group comprises a chain of 2 to 6 carbon atoms; and (c) the ester compound has a degree of substitution with the first group of about 0.001 to about 1.5.

In one embodiment, the molded article further comprises starch. In one embodiment, the molded article further comprises a plasticizer. In another embodiment, the molded article further comprises starch and a plasticizer.

In a further embodiment, the polysaccharide comprises particles having an average particle size in at least one dimension in the range of from about 20 nm to about 800 μm. In another embodiment, the molded article further comprises carbon black. In yet another embodiment, the molded article further comprises inorganic particles selected from titanium dioxide, calcium carbonate, mica, vermiculite, silica, kaolin, talc, or a mixture thereof. In one embodiment, the polysaccharide comprises an enzymatically-produced polysaccharide.

In another embodiment, the molded article comprises from about 60 weight percent to about 100 weight percent polysaccharide, based on the total weight of the article. In yet another embodiment, the molded article further comprises starch, and the article comprises from about 60 weight percent to about 100 weight percent polysaccharide and starch, based on the total weight of the article.

In yet another embodiment, the molded article further comprises a plasticizer, and the molded article comprises from about 1 weight percent to about 60 weight percent plasticizer, based on the total weight of the article. In some embodiments, the plasticizer comprises fructose, sorbitol, sucrose, glycerol, polyethylene glycol having a number average molecular weight from about 100 to about 2000 g/mole, triethylene glycol, methyl lactate, ethyl lactate, sodium lactate, inulin, diglycerol, triglycerol, maltodextrin 6, propylene glycol, propylene carbonate, dimethyl ether isosorbide, methyl levulinate, methyl urea, gamma-valerolactone, triethyl citrate, glycerol monoacetate, glycerol diacetate, glycerol triacetate, water, or combinations thereof.

In one embodiment, the molded article further comprises a plasticizer, and the polysaccharide comprises poly alpha-1,3-glucan and the plasticizer comprises glycerol. In another embodiment, the molded article further comprises a plasticizer, and the polysaccharide comprises poly alpha-1,3-glucan and the plasticizer comprises water.

In one embodiment, the molded article comprises from about 1 weight percent to about 50 weight percent starch, based on the total weight of the article.

Also disclosed herein are molded articles, wherein the article is a container, a handle, packaging, a tray, a bottle, a cup, a sheet, a disposable food packaging item, an automotive part, a casing for an electronic device, or a toy.

Also disclosed herein is a compression molding process for making a molded article, the process comprising the steps of:

a) combining a polysaccharide and optionally a plasticizer, starch, or a combination thereof to form a mixture;
b) heating the mixture to a temperature in the range of from about 140° C. to about 220° C. while applying pressure in the range of from about 0.5 MPa to about 25 MPa;
wherein the polysaccharide comprises:
i) poly alpha-1,3-glucan;
ii) poly alpha-1,3-1,6-glucan; or
iii) a graft copolymer that comprises:
  (A) a backbone comprising dextran with a weight-average molecular weight (Mw) of at least about 100000 Daltons, and
  (B) poly alpha-1,3-glucan side chains comprising at least about 95% alpha-1,3-glucosidic linkages; or
iv) a composition comprising a poly alpha-1,3-glucan ester compound represented by Structure I:

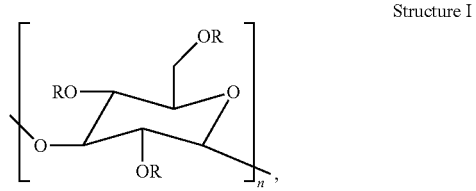

Structure I wherein
(A) n is at least 6;
(B) each R is independently an —H or a first group comprising —CO—$C_x$—COOH, wherein the —$C_x$— portion of said first group comprises a chain of 2 to 6 carbon atoms; and (C) the ester compound has a degree of substitution with the first group of about 0.001 to about 1.5.

BRIEF DESCRIPTION OF THE DRAWINGS

The disclosure is illustrated by way of example and not limited to the accompanying figures.

DETAILED DESCRIPTION

Figure 1:
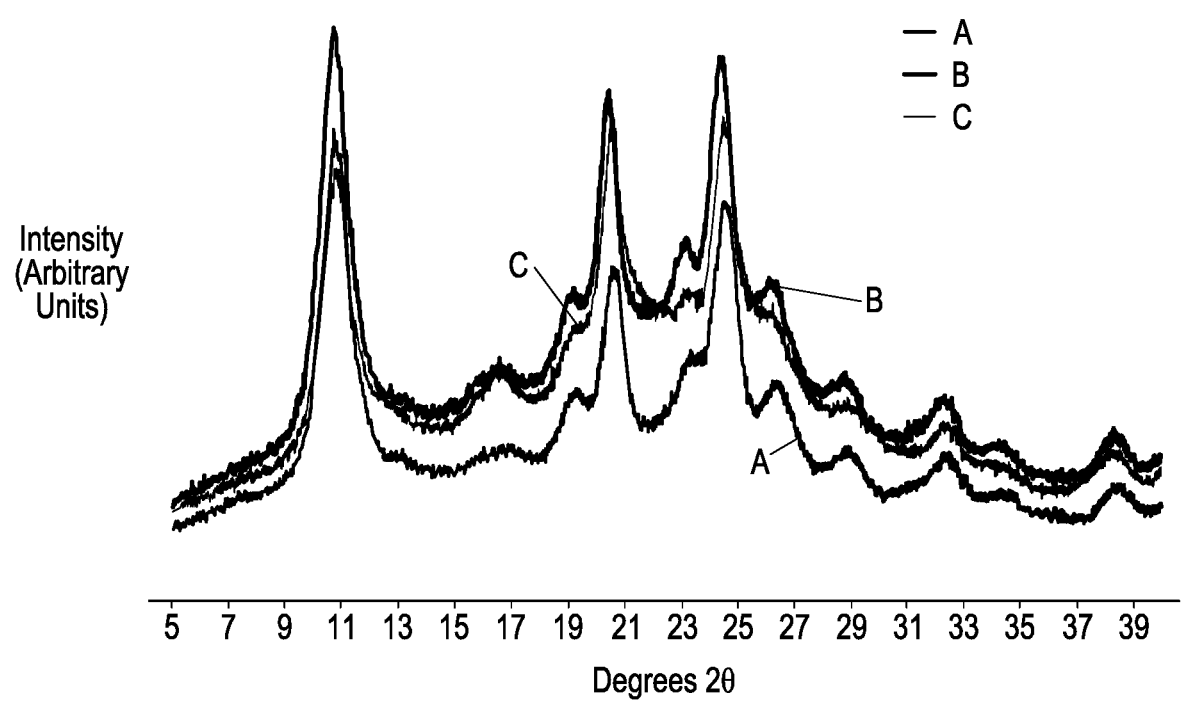
FIG. 1 is a representation of the X-ray diffractograms before and after molding dry powder poly alpha-1,3-glucan at 180° C. or 200° C. Line A shows data for dry poly alpha-1,3-glucan powder before compression molding. Line B shows data for the molded article obtained by molding poly alpha-1,3-glucan dry powder at 180° C. Line C shows data for the molded article obtained by molding poly alpha-1,3-glucan dry powder at 200° C.

All patents, patent applications, and publications cited herein are incorporated herein by reference in their entirety.

As used herein, the term "embodiment" or "disclosure" is not meant to be limiting, but applies generally to any of the embodiments defined in the claims or described herein. These terms are used interchangeably herein.

In this disclosure, a number of terms and abbreviations are used. The following definitions apply unless specifically stated otherwise.

The articles "a", "an", and "the" preceding an element or component are intended to be nonrestrictive regarding the number of instances (i.e. occurrences) of the element or component. There "a", "an", and "the" should be read to include one or at least one, and the singular word form of the element or component also includes the plural unless the number is obviously meant to be singular.

The term "comprising" means the presence of the stated features, integers, steps, or components as referred to in the claims, but that it does not preclude the presence or addition of one or more other features, integers, steps, components, or groups thereof. The term "comprising" is intended to include embodiments encompassed by the terms "consisting essentially of" and "consisting of". Similarly, the term "consisting essentially of" is intended to include embodiments encompassed by the term "consisting of".

Where present, all ranges are inclusive and combinable. For example, when a range of "1 to 5" is recited, the recited range should be construed as including ranges "1 to 4", "1 to 3", 1-2", "1-2 and 4-5", "1-3 and 5", and the like.

As used herein in connection with a numerical value, the term "about" refers to a range of +/−0.5 of the numerical value, unless the term is otherwise specifically defined in context. For instance, the phrase a "pH value of about 6" refers to pH values of from 5.5 to 6.5, unless the pH value is specifically defined otherwise.

It is intended that every maximum numerical limitation given throughout this Specification includes every lower numerical limitation, as if such lower numerical limitations were expressly written herein. Every minimum numerical limitation given throughout this Specification will include every higher numerical limitation, as if such higher numerical limitations were expressly written herein. Every numerical range given throughout this Specification will include every narrower numerical range that falls within such broader numerical range, as if such narrower numerical ranges were all expressly written herein.

The features and advantages of the present disclosure will be more readily understood, by those of ordinary skill in the art from reading the following detailed description. It is to be appreciated that certain features of the disclosure, which are, for clarity, described above and below in the context of separate embodiments, may also be provided in combination in a single element. Conversely, various features of the disclosure that are, for brevity, described in the context of a single embodiment, may also be provided separately or in any sub-combination.

The use of numerical values in the various ranges specified in this application, unless expressly indicated otherwise, are stated as approximations as though the minimum and maximum values within the stated ranges were both proceeded by the word "about". In this manner, slight variations above and below the stated ranges can be used to achieve substantially the same results as values within the ranges. Also, the disclosure of these ranges is intended as a continuous range including each and every value between the minimum and maximum values.

As used herein:

The terms "percent by weight", "weight percentage (wt %)" and "weight-weight percentage (% w/w)" are used interchangeably herein. Percent by weight refers to the percentage of a material on a mass basis as it is comprised in a composition, mixture or solution.

The phrase "water insoluble" means that less than 5 grams of the substance, for example, the alpha-(1,3-glucan) polymer, dissolves in 100 milliliters of water at 23° C. In other embodiments, water insoluble means that less than 4 grams or 3 grams or 2 grams or 1 grams of the substance is dissolved in water at 23° C.

The "molecular weight" of the poly alpha-1,3-glucan and poly alpha-1,3-glucan compounds herein can be represented as number-average molecular weight ($M_n$) or as weight-average molecular weight ($M_w$). Alternatively, molecular weight can be represented as Daltons, grams/mole, DPw (weight average degree of polymerization), or DPn (number average degree of polymerization). Various means are known in the art for calculating these molecular weight measurements, such as high-pressure liquid chromatography (HPLC), size exclusion chromatography (SEC), or gel permeation chromatography (GPC).

As used herein, "weight average molecular weight" or "$M_w$" is calculated as $M_w = \Sigma N_i M_i^2 / \Sigma N_i M_i$; where $M_i$ is the molecular weight of a chain and $N_i$ is the number of chains of that molecular weight. The weight average molecular weight can be determined by techniques such as static light scattering, gas chromatography (GC), high pressure liquid chromatography (HPLC), gel permeation chromatography (GPC), small angle neutron scattering, X-ray scattering, and sedimentation velocity.

As used herein, "number average molecular weight" or "$M_n$" refers to the statistical average molecular weight of all the polymer chains in a sample. The number average molecular weight is calculated as $M_n = \Sigma N_i M_i / \Sigma N_i$ where $M_i$ is the molecular weight of a chain and $N_i$ is the number of chains of that molecular weight. The number average molecular weight of a polymer can be determined by techniques such as gel permeation chromatography, viscometry via the (Mark-Houwink equation), and colligative methods such as vapor pressure osmometry, end-group determination, or proton NMR.

The term "copolymer" herein refers to a polymer comprising at least two different types of alpha-glucan, such as dextran and poly alpha-1,3-glucan.

The terms "graft copolymer", "branched copolymer" and the like herein generally refer to a copolymer comprising a "backbone" (or "main chain") and side chains branching from the backbone. The side chains are structurally distinct from the backbone. Examples of graft copolymers herein comprise a backbone comprising dextran with a Mw of at least about 100000 Daltons, and side chains of poly alpha-1,3-glucan comprising at least about 95% alpha-1,3-glucosidic linkages. In some aspects, a dextran backbone can have a poly alpha-1,3-glucan extension, since the non-reducing end of dextran can prime poly alpha-1,3-glucan synthesis by a glucosyltransferase enzyme. A backbone can thus be a dextran-poly alpha-1,3-glucan linear copolymer in some instances. A backbone in some aspects can itself be a branched structure as disclosed below; the addition of poly alpha-1,3-glucan to such a backbone increases the branching of the original branched structure.

The terms "poly alpha-1,3-glucan side chain" and "poly alpha-1,3-glucan branch" can be used interchangeably herein. A poly alpha-1,3-glucan side chain is typically an extension of a dextran branch (e.g., pendant glucose or short chain), since a dextran branch has a non-reducing end that can prime poly alpha-1,3-glucan synthesis by a glucosyltransferase enzyme.

As used herein, the term "article" refers to an unfinished or finished item, thing, object, or an element or feature of an unfinished or finished item, thing or object. As used herein, when an article is unfinished, the term "article" may refer to any item, thing, object, element, device, etc. that has a form, shape, configuration that may undergo further processing in order to become a finished article. As used herein, when an article is finished, the term "article" refers to an item, thing, object, element, device, etc. that is in a form, shape, configuration that is suitable for a particular use/purpose without further processing of the entire entity or a portion of it.

An article may comprise one or more element(s) or subassembly(ies) that either are partially finished and awaiting further processing or assembly with other elements/subassemblies that together will comprise a finished article. In addition, as used herein, the term "article" may refer to a system or configuration of articles.

The present disclosure is directed to molded articles comprising, or consisting essentially of:

a polysaccharide, wherein the polysaccharide comprises i) poly alpha-1,3-glucan;

ii) poly alpha-1,3-1,6-glucan;

iii) a graft copolymer that comprises:

(A) a backbone comprising dextran with a weight-average molecular weight (Mw) of at least about 100000 Daltons, and (B) poly alpha-1,3-glucan side chains comprising at least about 95% alpha-1,3-glucosidic linkages; or iv) a composition comprising a poly alpha-1,3-glucan ester compound represented by Structure I:

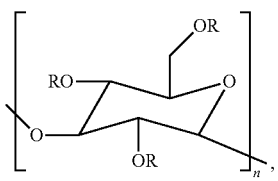

Structure I wherein
(A) n is at least 6;
(B) each R is independently an —H or a first group comprising —CO—$C_x$—COOH, wherein the —$C_x$— portion of said first group comprises a chain of 2 to 6 carbon atoms; and
(C) the ester compound has a degree of substitution with the first group of about 0.001 to about 1.5.

The molded articles can be prepared by compression molding methods, and can be useful as flexible or rigid packaging, as a tray, bottle, thin walled container, or as a part, casing, or toy. Advantageously, the molded articles can have desired mechanical strength, oxygen barrier, and water barrier properties, are made from renewable resources, and have good recyclability.

Various polysaccharides are useful in preparing the molded articles disclosed herein, and mixtures of these polysaccharides can also be used. In one embodiment, the polysaccharide comprises poly alpha-1,3-glucan. The terms "poly alpha-1,3-glucan", "alpha-1,3-glucan polymer" and "glucan polymer" are used interchangeably herein. The term "glucan" herein refers to a polysaccharide of D-glucose monomers that are linked by glycosidic linkages. Poly alpha-1,3-glucan is a polymer comprising glucose monomeric units linked together by glycosidic linkages, wherein at least 50% of the glycosidic linkages are alpha-1,3-glycosidic linkages. Poly alpha-1,3-glucan is a type of polysaccharide. The structure of poly alpha-1,3-glucan can be illustrated as follows:

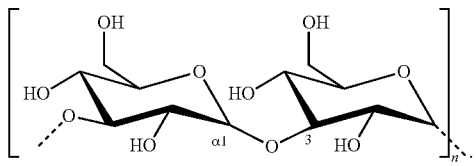

The poly alpha-1,3-glucan can be prepared using chemical methods, or it can be prepared by extracting it from various organisms, such as fungi, that produce poly alpha-1,3-glucan. Alternatively, poly alpha-1,3-glucan can be enzymatically produced from sucrose using one or more glucosyltransferase (gtf) enzymes, as described in U.S. Pat. Nos. 7,000,000; 8,642,757; and 9,080195, for example. Using the procedures given therein, the polymer is made directly in a one-step enzymatic reaction using a recombinant glucosyltransferase enzyme, for example the gtfJ enzyme, as the catalyst and sucrose as the substrate. The poly alpha-1,3-glucan is produced with fructose as the by-product. As the reaction progresses, the poly alpha-1,3-glucan precipitates from solution.

The process to produce poly alpha-1,3-glucan from sucrose using, for example, a glucosyl transferase enzyme, can result in a slurry of the poly alpha-1,3-glucan in water. The slurry can be filtered to remove some of the water, giving the solid poly alpha-1,3-glucan as a wet cake containing in the range of from 30 to 50 percent by weight of poly alpha-1,3-glucan, with the remainder being water. In some embodiments, the wet cake comprises in the range of from 35 to 45 percent by weight of the poly alpha-1,3-glucan. The wet cake can be washed with water to remove any water soluble impurities, for example, sucrose, fructose, or phosphate buffers. In some embodiments, the wet cake comprising the poly alpha-1,3-glucan can be used as is. In other embodiments, the wet cake can be further dried under reduced pressure, at elevated temperature, by freeze drying, or a combination thereof, to give a powder comprising greater than or equal to 50 percent by weight of the poly alpha-1,3-glucan. In some embodiments, the poly alpha-1,3-glucan can be a powder, comprising less than or equal to 20 percent by weight water. In other embodiments, the poly alpha-1,3-glucan can be a dry powder comprising less than or equal to 15, 14, 13, 12, 11, 10, 9, 8, 7, 6, 5, 4, 3, 2, or 1 percent by weight water.

In some embodiments, the percentage of glycosidic linkages between the glucose monomer units of the poly alpha-1,3-glucan that are alpha-1,3 is greater than or equal to 50%, 60%, 70%, 80%, 90%, 95%, 96%, 97%, 98%, 99%, or 100% (or any integer value between 50% and 100%). In such embodiments, accordingly, poly alpha-1,3-glucan has less than or equal to 50%, 40%, 30%, 20%, 10%, 5%, 4%, 3%, 2%, 1%, or 0% (or any integer value between 0% and 50%) of glycosidic linkages that are not alpha-1,3.

The terms "glycosidic linkage" and "glycosidic bond" are used interchangeably herein and refer to the type of covalent bond that joins a carbohydrate (sugar) molecule to another group such as another carbohydrate. The term "alpha-1,3-glycosidic linkage" as used herein refers to the type of covalent bond that joins alpha-D-glucose molecules to each other through carbons 1 and 3 on adjacent alpha-D-glucose rings. This linkage is illustrated in the poly alpha-1,3-glucan structure provided above. Herein, "alpha-D-glucose" will be referred to as "glucose". All glycosidic linkages disclosed herein are alpha-glycosidic linkages, except where otherwise noted.

The "molecular weight" of poly alpha-1,3-glucan can be represented as number-average molecular weight ($M_n$) or as weight-average molecular weight ($M_w$). Alternatively, molecular weight can be represented as Daltons, grams/mole, DPw (weight average degree of polymerization), or DPn (number average degree of polymerization).

The poly alpha-1,3-glucan may have a weight average degree of polymerisation (DPw) of at least about 400. In some embodiments, the poly alpha-1,3-glucan has a DPw of from about 400 to about 1400, or from about 400 to about 1000, or from about 500 to about 900.

In one embodiment, the polysaccharide comprises water insoluble alpha-(1,3-glucan) polymer having 90% or greater α-1,3-glycosidic linkages, less than 1% by weight of alpha-1,3,6-glycosidic branch points, and a number average degree of polymerization in the range of from 55 to 10,000.

In one embodiment, the polysaccharide comprises poly alpha-1,3-1,6-glucan. Poly alpha-1,3-1,6-glucan is a type of polysaccharide containing a mixed glycosidic linkage content. Poly alpha-1,3-1,6-glucan is a polymer comprising glucose monomeric units linked together by glycosidic linkages (i.e., glucosidic linkages), wherein at least about 30% of the glycosidic linkages are alpha-1,3-glycosidic linkages, and at least about 30% of the glycosidic linkages are alpha-1,6-glycosidic linkages. The meaning of the term poly alpha-1,3-1,6-glucan in certain embodiments herein excludes "alternan," which is a glucan containing alpha-1,3 linkages and alpha-1,6 linkages that consecutively alternate with each other (U.S. Pat. No. 5,702,942, U.S. Pat. Appl. Publ. No. 2006/0127328). Alpha-1,3 and alpha-1,6 linkages that "consecutively alternate" with each other can be visually represented by . . . G-1,3-G-1,6-G-1,3-G-1,6-G-1,3-G-1,6-G-1,3-G- . . . , for example, where G represents glucose.

In one embodiment, the polysaccharide comprises poly alpha-1,3-1,6-glucan wherein (i) at least 30% of the glycosidic linkages of the poly alpha-1,3-1,6-glucan are alpha-1,3 linkages, (ii) at least 30% of the glycosidic linkages of the poly alpha-1,3-1,6-glucan are alpha-1,6 linkages, (iii) the poly alpha-1,3-1,6-glucan has a weight average degree of polymerization ($DP_w$) of at least 1000; and (iv) the alpha-1,3 linkages and alpha-1,6 linkages of the poly alpha-1,3-1,6-glucan do not consecutively alternate with each other. In another embodiment, at least 60% of the glycosidic linkages of the poly alpha-1,3-1,6-glucan are alpha-1,6 linkages. The term "alpha-1,6-glycosidic linkage" as used herein refers to the covalent bond that joins alpha-D-glucose molecules to each other through carbons 1 and 6 on adjacent alpha-D-glucose rings.

Poly alpha-1,3-1,6-glucan is a product of a glucosyltransferase enzyme, as disclosed in United States Patent Application Publication 2015/0232785 A1, which is incorporated herein by reference.

The glycosidic linkage profile of a poly alpha-1,3-1,6-glucan herein can be determined using any method known in the art. For example, a linkage profile can be determined using methods that use nuclear magnetic resonance (NMR) spectroscopy (e.g., $^{13}C$ NMR or $^1H$ NMR).

These and other methods that can be used are disclosed in *Food Carbohydrates: Chemistry, Physical Properties, and Applications* (S. W. Cui, Ed., Chapter 3, S. W. Cui, Structural Analysis of Polysaccharides, Taylor & Francis Group LLC, Boca Raton, Fla., 2005), which is incorporated herein by reference.

The "molecular weight" of a poly alpha-1,3-1,6-glucan herein can be represented as number-average molecular weight ($M_n$) or as weight-average molecular weight ($M_w$). Alternatively, molecular weight can be represented as Daltons, grams/mole, $DP_w$ (weight average degree of polymerization), or $DP_n$ (number average degree of polymerization).

The term "poly alpha-1,3-1,6-glucan wet cake" herein refers to poly alpha-1,3-1,6-glucan that has been separated from a slurry and washed with water or an aqueous solution. Poly alpha-1,3-1,6-glucan is not completely dried when preparing a wet cake.

In some embodiments:
(i) at least 30% of the glycosidic linkages of the poly alpha-1,3-1,6-glucan are alpha-1,3 linkages,
(ii) at least 30% of the glycosidic linkages of the poly alpha-1,3-1,6-glucan are alpha-1,6 linkages,
(iii) the poly alpha-1,3-1,6-glucan has a weight average degree of polymerization ($DP_w$) of at least 1000; and
(iv) the alpha-1,3 linkages and alpha-1,6 linkages of the poly alpha-1,3-1,6-glucan do not consecutively alternate with each other.

At least 30% of the glycosidic linkages of poly alpha-1,3-1,6-glucan are alpha-1,3 linkages, and at least 30% of the glycosidic linkages of the poly alpha-1,3-1,6-glucan are alpha-1,6 linkages. Alternatively, the percentage of alpha-1,3 linkages in poly alpha-1,3-1,6-glucan herein can be at least 31%, 32%, 33%, 34%, 35%, 36%, 37%, 38%, 39%, 40%, 41%, 42%, 43%, 44%, 45%, 46%, 47%, 48%, 49%, 50%, 51%, 52%, 53%, 54%, 55%, 56%, 57%, 58%, 59%, 60%, 61%, 62%, 63%, or 64%. Alternatively still, the percentage of alpha-1,6 linkages in poly alpha-1,3-1,6-glucan herein can be at least 31%, 32%, 33%, 34%, 35%, 36%, 37%, 38%, 39%, 40%, 41%, 42%, 43%, 44%, 45%, 46%, 47%, 48%, 49%, 50%, 51%, 52%, 53%, 54%, 55%, 56%, 57%, 58%, 59%, 60%, 61%, 62%, 63%, 64%, 65%, 66%, 67%, 68%, or 69%.

A poly alpha-1,3-1,6-glucan can have any one the aforementioned percentages of alpha-1,3 linkages and any one of the aforementioned percentages of alpha-1,6 linkages, just so long that the total of the percentages is not greater than 100%. For example, poly alpha-1,3-1,6-glucan herein can have (i) any one of 30%, 31%, 32%, 33%, 34%, 35%, 36%, 37%, 38%, 39%, or 40% (30%-40%) alpha-1,3 linkages and (ii) any one of 60%, 61%, 62%, 63%, 64%, 65%, 66%, 67%, 68%, or 69% (60%-69%) alpha-1,6 linkages, just so long that the total of the percentages is not greater than 100%. Non-limiting examples include poly alpha-1,3-1,6-glucan with 31% alpha-1,3 linkages and 67% alpha-1,6 linkages. In certain embodiments, at least 60% of the glycosidic linkages of the poly alpha-1,3-1,6-glucan are alpha-1,6 linkages.

A poly alpha-1,3-1,6-glucan can have, for example, less than 10%, 9%, 8%, 7%, 6%, 5%, 4%, 3%, 2%, or 1% of glycosidic linkages other than alpha-1,3 and alpha-1,6. In another embodiment, a poly alpha-1,3-1,6-glucan only has alpha-1,3 and alpha-1,6 linkages.

Other examples of alpha-1,3 and alpha-1,6 linkage profiles and methods for their production are disclosed in published United States patent application 2015/0232785. The linkages and DPw of Glucan produced by various Gtf Enzymes, as disclosed in US 2015/0232785, are listed below in Table A.

TABLE A

Linkages and $DP_w$ of Glucan Produced by Various Gtf Enzymes

| Gtf | Glucan Alpha Linkages | | $DP_w$ |
|---|---|---|---|
| | % 1,3 | % 1,6 | |
| 4297 | 31 | 67 | 10540 |
| 3298 | 50 | 50 | 1235 |
| 0544 | 62 | 36 | 3815 |
| 5618 | 34 | 66 | 3810 |
| 2379 | 37 | 63 | 1640 |

The backbone of a poly alpha-1,3-1,6-glucan disclosed herein can be linear/unbranched. Alternatively, there can be branches in the poly alpha-1,3-1,6-glucan. A poly alpha-1,3-1,6-glucan in certain embodiments can thus have no branch points or less than about 30%, 29%, 28%, 27%, 26%, 25%, 24%, 23%, 22%, 21%, 20%, 19%, 18%, 17%, 16%, 15%, 14%, 13%, 12%, 11%, 10%, 9%, 8%, 7%, 6%, 5%, 4%, 3%, 2%, or 1% branch points as a percent of the glycosidic linkages in the polymer.

The alpha-1,3 linkages and alpha-1,6 linkages of a poly alpha-1,3-1,6-glucan do not consecutively alternate with each other. For the following discussion, consider that . . . G-1,3-G-1,6-G-1,3-G-1,6-G-1,3-G- . . . (where G represents glucose) represents a stretch of six glucose monomeric units linked by consecutively alternating alpha-1,3 linkages and alpha-1,6 linkages. Poly alpha-1,3-1,6-glucan in certain embodiments herein comprises less than 2, 3, 4, 5, 6, 7, 8, 9, 10, or more glucose monomeric units that are linked consecutively with alternating alpha-1,3 and alpha-1,6 linkages.

The molecular weight of a poly alpha-1,3-1,6-glucan can be measured as $DP_w$ (weight average degree of polymerization) or $DP_n$ (number average degree of polymerization). Alternatively, molecular weight can be measured in Daltons or grams/mole. It may also be useful to refer to the number-average molecular weight ($M_n$) or weight-average molecular weight ($M_w$) of the poly alpha-1,3-1,6-glucan.

A poly alpha-1,3-1,6-glucan useful in preparing molded articles can have a $DP_w$ of at least about 1000. For example, the $DP_w$ of the poly alpha-1,3-1,6-glucan can be at least about 10000. Alternatively, the $DP_w$ can be at least about 1000 to about 15000. Alternatively still, the $DP_w$ can be at least about 1000, 2000, 3000, 4000, 5000, 6000, 7000, 8000, 9000, 10000, 11000, 12000, 13000, 14000, or 15000 (or any integer between 1000 and 15000), for example. Given that a poly alpha-1,3-1,6-glucan herein can have a $DP_w$ of at least about 1000, such a glucan polymer is typically water-insoluble.

A poly alpha-1,3-1,6-glucan herein can have an $M_w$ of at least about 50000, 100000, 200000, 300000, 400000, 500000, 600000, 700000, 800000, 900000, 1000000, 1100000, 1200000, 1300000, 1400000, 1500000, or 1600000 (or any integer between 50000 and 1600000), for example. The $M_w$ in certain embodiments is at least about 1000000. Alternatively, poly alpha-1,3-1,6-glucan can have an $M_w$ of at least about 4000, 5000, 10000, 20000, 30000, or 40000, for example.

A poly alpha-1,3-1,6-glucan herein can comprise at least 20 glucose monomeric units, for example. Alternatively, the number of glucose monomeric units can be at least 25, 50, 100, 500, 1000, 2000, 3000, 4000, 5000, 6000, 7000, 8000, or 9000 (or any integer between 10 and 9000), for example.

In another embodiment, the polysaccharide comprises poly alpha-1,3-glucan in the form of a graft copolymer that comprises:

(A) a backbone comprising dextran with a weight-average molecular weight (Mw) of at least about 100000 Daltons, and (B) poly alpha-1,3-glucan side chains comprising at least about 95% alpha-1,3-glucosidic linkages. Such graft copolymers and methods for preparing the graft copolymers are disclosed in published patent application WO 2017/079595, which is incorporated herein by reference in its entirety.

In one embodiment, the poly alpha-1,3-glucan side chains comprise at least about 99% alpha-1,3-glucosidic linkages. In another embodiment, the individual Mw of one or more poly alpha-1,3-glucan side chains is at least about 100000 Daltons. In another embodiment, the dextran comprises:
(i) about 87-93 wt % glucose linked at positions 1 and 6;
(ii) about 0.1-1.2 wt % glucose linked at positions 1 and 3;
(iii) about 0.1-0.7 wt % glucose linked at positions 1 and 4;
(iv) about 7.7-8.6 wt % glucose linked at positions 1, 3 and 6; and
(v) about 0.4-1.7 wt % glucose linked at:
(a) positions 1, 2 and 6, or (b) positions 1, 4 and 6;
wherein the Mw of the dextran is about 50-200 million Daltons.

In one embodiment, the graft copolymer comprises at least about 2.0 wt % dextran.

The graft copolymer as disclosed herein can be prepared using a method comprising:

(a) contacting at least (i) water, (ii) sucrose, (iii) dextran with a weight-average molecular weight (Mw) of at least about 100000 Daltons, and (iv) a glucosyltransferase enzyme that synthesizes poly alpha-1,3-glucan comprising at least about 95% alpha-1,3-glucosidic linkages, whereby a graft copolymer is produced; and (b) optionally, isolating the graft copolymer produced in step (a). The graft copolymer can be prepared using enzymes disclosed in published United States Patent Application 2016-0122445 A1 and U.S. Pat. No. 8,871,474.

A dextran that forms the backbone of a graft copolymer herein can comprise, for example, about or at least about 50%, 51%, 52%, 53%, 54%, 55%, 56%, 57%, 58%, 59%, 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, or 99% alpha-1,6-glucosidic linkages. Such a percent alpha-1,6 linkage profile is that taking account the total of all linkages in the dextran (main chain and branch portions combined). "Dextran branches" and like terms herein are meant to encompass any branches that exist in a dextran polymer prior to its use to prepare a graft copolymer as presently disclosed. In some embodiments, a dextran comprises a main chain comprising about, or at least about, 90%, 91%, 92%, 93%, 94%, 95%, 96%, 97%, 98%, 99%, or 100% alpha-1,6-glucosidic linkages.

A dextran herein can comprise, for example, about or at least about 1%, 2%, 3%, 4%, 5%, 6%, 7%, 8%, 9%, 10%, 11%, 12%, 13%, 14%, 15%, 16%, 17%, 18%, 19%, or 20% alpha-1,4, alpha-1,3 and/or alpha-1,2 glucosidic linkages. Typically, such linkages exist entirely, or almost entirely, in branch portions of the dextran, including branch points. In some embodiments, dextran branches may comprise one, two (e.g., alpha-1,4 and alpha-1,3; alpha-1,4 and alpha-1,2; alpha-1,3 and alpha-1,2), or all three of these types of linkages. The total percentage of alpha-1,4, alpha-1,3 and/or alpha-1,2 glucosidic linkages in a dextran herein is typically not greater than 50%. In some aspects, such as with dextran comprising a main chain having about, or at least about, 90%, 91%, 92%, 93%, 94%, 95%, 96%, 97%, 98%, 99%, or 100% alpha-1,6-glucosidic linkages, such dextran comprises about, or at least about, 1%, 2%, 3%, 4%, 5%, 6%, 7%, 8%, 9%, or 10% alpha-1,4, alpha-1,3 and/or alpha-1,2 glucosidic linkages. A branch point of a dextran herein can comprise an alpha-1,4, alpha-1,3, or alpha-1,2 glucosidic linkage (e.g., a branch may be alpha-1,3-linked to a dextran main chain). In some embodiments, all three of these branch points may exist, whereas in some embodiments only one or two (e.g., alpha-1,4 and alpha-1,3; alpha-1,4 and alpha-1,2; alpha-1,3 and alpha-1,2) types of these branch points exist. It is contemplated that a branch point occurs on average every (or at least every) 5, 10, 15, 20, 25, 30, 35, 40, 45, 50, 10-30, 15-25, 20-30, or 20-40 glucose units of a dextran main chain, for example. Branches of a dextran molecule comprising alpha-1,4, alpha-1,3, and/or alpha-1,2 glucosidic linkages herein typically are one to three glucose monomers in length and comprise less than about 5-10% of all the glucose monomers of a dextran polymer. A branch comprising one glucose unit can be optionally be referred to as a pendant glucose group. In some embodiments, the branches of a dextran molecule can comprise less than about 10%, 9%, 8%, 7%, 6%, 5%, 4%, 3%, 2%, or 1% of all the glucose monomers of a dextran molecule. A dextran in certain embodiments can have about 1%, 2%, 3%, 4%, 5%, 6%, 7%, 8%, 9%, or 10% branch points as a percent of the glucosidic linkages in the polymer. The glucosidic linkage profile of a branch herein can optionally be characterized to include the glucosidic linkage by which the branch is linked to another chain.

A backbone of a graft copolymer in certain embodiments can be comprised entirely of a dextran as presently disclosed. However, in some aspects, a backbone can comprise other elements. For example, a graft copolymer backbone may comprise poly alpha-1,3-glucan originating from the non-reducing side of a dextran main chain, by virtue of the main chain (at its non-reducing end) serving to prime poly alpha-1,3-glucan synthesis during synthesis of the graft copolymer.

The molecular weight (Mw [weight-average molecular weight]) of a dextran that forms the backbone of a graft copolymer herein can be at least about 100000 Daltons A graft copolymer herein comprises a dextran backbone from which there are poly alpha-1,3-glucan side chains comprising at least about 95% alpha-1,3-glucosidic linkages. These side chains typically result via reacting a dextran as presently disclosed herein with a glucosyltransferase that can synthesize poly alpha-1,3-glucan. For clarity purposes, these side chains ought not be considered branches of dextran.

A poly alpha-1,3-glucan side chain in certain aspects can comprise about, or at least about, 95%, 96%, 97%, 98%, 99%, 99.5%, or 100% alpha-1,3 glucosidic linkages. Such a side chain is contemplated in some aspects to be synthesized with a glucosyltransferase enzyme using a pendant glucose or other branch portion of dextran (both of which present non-reducing ends to the enzyme for extension) as a primer. Where a side chain is synthesized from a pendant glucose that is itself alpha-1,3-linked to the dextran main chain, the resulting side chain can have 100% or a very high (e.g., 98% or greater) percentage of alpha-1,3-glucosidic linkages. In some embodiments, the glucosidic linkage between a dextran main chain and a pendant glucose or longer branch is considered a linkage of the side chain. In some embodiments, the glucosidic linkage between a dextran main chain and a branch, as well as the glucosidic linkages within a branch from which a side chain was synthesized, are considered in determining the linkage profile of the side chain. Side chains in some embodiments have no alpha-1,6 glucosidic linkages, such as with graft copolymers in which the dextran component is of 100000 to 200000 Daltons.

The Mw of a poly alpha-1,3-glucan side chain herein can be about, or at least about 1620, 1650, 1700, 2000, 5000, 10000, 15000, 16200, 20000, 25000, 30000, 40000, 50000, 60000, 70000, 75000, 80000, 90000, 100000, 110000, 120000, 125000, 130000, 140000, 150000, 160000, 162000, or 165000 Daltons, for example. It is contemplated that the side chains of a graft copolymer herein are relatively homogenous in size. For instance, the sides chains of a graft copolymer may each be at least about 100000, 120000, 140000, 160000, 162000, or 165000 Daltons. Also for instance, the sides chains of a graft copolymer may each have a Mw in the range of about 150000-165000, 155000-165000, or 160000-165000 Daltons. The average Mw of the side chains of a graft copolymer can also be referred to, if desired; any of the foregoing side chain Mw's can be considered an average Mw of all the side chains of a copolymer. Any of the side chain Mw's (or any glucan Mw) disclosed herein can optionally be characterized in terms of DPw (Mw/162.14).

The number of poly alpha-1,3-glucan side chains of a graft copolymer herein can be at least 3, 4, 5, 6, 7, 8, 9, 10, 11, 12, 13, 14, 15, 16, 17, 18, 19, 20, 21, 22, 23, 24, 25, 26, 27, 28, 29, or 30, for example. In some embodiments, the number of side chains is 4, 5, or 6, for example. The foregoing number of poly alpha-1,3-glucan side chains in some aspects is a characteristic of side chains that are at least about 100000, 120000, 140000, 160000, 162000, or 165000 Daltons; any dextran component herein such as a very large dextran or a dextran of 100000 to 200000 Daltons can be comprised in such a copolymer. Still, in further aspects, the foregoing number of poly alpha-1,3-glucan side chains can characterize a graft copolymer in which the dextran component has a pendant glucose and/or branch (from which a side chain can be primed/synthesized) on average once every 15, 16, 17, 18, 19, 20, 21, 22, 23, 24, or 25 glucose units of a dextran main chain. Based on the size of a dextran component (e.g., 100000-200000 Daltons), the positioning of branches/pendant glucoses on the dextran main chain (e.g., about one every 20 glucose units), and the number of poly alpha-1,3-glucan side chains of a graft copolymer, it is contemplated in some cases that a graft copolymer has a majority (e.g., at least 80%, 85%, 90%, 95%) of its original dextran branches/pendant glucoses non-extended into a poly alpha-1,3-glucan side chain (i.e., most of the branches/pendant glucoses are as they existed in the dextran before use thereof to synthesize a graft copolymer herein). Still, in some other embodiments, it is believed possible that a graft copolymer herein can have up to about 50, 100, 500, 1000, 5000, 10000, 15000, or 20000 poly alpha-1,3-glucan side chains.

The weight-average molecular weight of a dextran-poly alpha-1,3-glucan graft copolymer herein (i.e., the combined Mw of the original dextran molecule and the poly alpha-1,3-glucan side chains of a graft copolymer) can be about, or at least about, 750000, 800000, 900000, 1000000, 1100000, 1200000, 1300000, 1400000, 1500000, 1600000, 1700000, 1800000, 1900000, or 2000000 Daltons, for example. The weight-average molecular weight of a dextran-poly alpha-1,3-glucan graft copolymer that comprises a very large dextran component in some embodiments is believed to similar to the weight as disclosed above for the very large dextran component itself, but with the addition of about 0.5, 0.75, 1, 1.25, 1.5, 1.75 or 2 million Daltons (in embodiments in which there are a few poly alpha-1,3-glucan side chains). In yet some more aspects, the weight-average molecular weight of a dextran-poly alpha-1,3-glucan graft copolymer can be the sum of the Mw of any dextran molecule herein and the Mw of any poly alpha-1,3-glucan side chains (taking into account the number of side chains and Mw of each) disclosed herein. Also, Mw of a graft copolymer herein can optionally be expressed in terms of the dextran component Mw and poly alpha-1,3-glucan side chain Mw. In some aspects, the weight-average molecular weight of a dextran-poly alpha-1,3-glucan graft copolymer is not less than 600000, 650000, or 700000 Daltons.

In certain embodiments, a dextran-poly alpha-1,3-glucan graft copolymer can comprise about, or at least about, 2.0 wt % dextran. The wt % of dextran in a graft copolymer in some additional aspects can be about, or at least about, 0.5%, 1.0%, 1.5%, 2.0%, 2.1%, 2.2%, 2.3%, 2.4%, 2.5%, 3.0%, 3.5%, 4.0%, 5.5%, 6.0%, 6.5%, 7.0%, 7.5%, 8.0%, 8.5%, 9.0%, 9.5%, 10.0%, 10.5%, 11.0%, 11.5%, 12.0%, 15%, 20%, 25%, 30%, 35%, 40%, 45%, 50%, 55%, 60%, 65%, 70%, 75%, 80%, 85%, 90%, 95%, 96%, 97%, 98%, or 99% (or any integer between 1%-99%).

The polydispersity index (Mw/Mn) (PDI) of a dextran-poly alpha-1,3-glucan graft copolymer herein can be about, at least about, or less than about, 5.0, 4.75, 4.5, 4.25, 4.0, 3.75, 3.5, 3.25, 3.0, 2.75, 2.5, 2.25, or 2.0, for example.

A dextran-poly alpha-1,3-glucan graft copolymer as presently disclosed is typically insoluble under aqueous conditions (aqueous insoluble). For example, a graft copolymer can be insoluble or not completely dissolved in water or another aqueous composition at a temperature up to about 50, 60, 70, 80, 90, 100, 110, or 120° C. An aqueous composition herein such as an aqueous solution can comprise a solvent having at least about 10 wt % water.

In another embodiment, the polysaccharide comprises a composition comprising a poly alpha-1,3-glucan ester compound represented by Structure I:

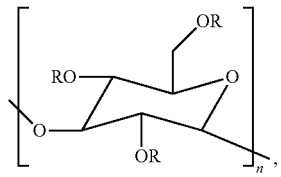

Structure I wherein
(i) n is at least 6;
(ii) each R is independently an —H or a first group comprising —CO—$C_x$—COOH, wherein the —$C_x$— portion of said first group comprises a chain of 2 to 6 carbon atoms; and
(iii) the ester compound has a degree of substitution with the first group of about 0.001 to about 1.5.

Such poly alpha-1,3-glucan esters and their preparation are disclosed in published patent application WO 2017/003808, which is incorporated herein in its entirety. In some embodiments, poly alpha-1,3-glucan ester compounds represented by Structure I and having a degree of substitution with the first group of about 0.001 to about 0.1 can be useful in preparing molded articles. In some embodiments, it is believed that poly alpha-1,3-glucan ester compounds represented by Structure I and having a degree of substitution with the first group of about 0.001 to about 3 may be useful in preparing molded articles as disclosed herein.

The terms "poly alpha-1,3-glucan ester compound", "poly alpha-1,3-glucan ester", "poly alpha-1,3-glucan ester derivative", "glucan ester" are used interchangeably herein.

A poly alpha-1,3-glucan ester compound of Structure I is termed an "ester" herein by virtue of comprising the substructure —CG-O—CO—$C_x$—, where "—CG-" represents carbon 2, 4, or 6 of a glucose monomeric unit of a poly alpha-1,3-glucan ester compound, and where "—CO—$C_x$—" is comprised in the first group.

A "first group" herein comprises —CO—$C_x$—COOH. The term "—$C_x$—" refers to a portion of the first group that typically comprises a chain of 2 to 6 carbon atoms, each carbon atom preferably having four covalent bonds.

The terms "poly alpha-1,3-glucan monoester" and "monoester" are used interchangeably herein. A poly alpha-1,3-glucan monoester contains one type of first group.

The terms "poly alpha-1,3-glucan mixed ester" and "mixed ester" are used interchangeably herein. A poly alpha-1,3-glucan mixed ester contains two or more types of a first group.

The terms "reaction", "esterification reaction", "reaction composition", "reaction preparation" and the like are used interchangeably herein and refer to a reaction comprising, or consisting of, poly alpha-1,3-glucan and at least one cyclic organic anhydride. A reaction is placed under suitable conditions (e.g., time, temperature, pH) for esterification of one or more hydroxyl groups of the glucose units of poly alpha-1,3-glucan with a first group provided by the cyclic organic anhydride, thereby yielding a poly alpha-1,3-glucan ester compound.

The terms "cyclic organic anhydride", "cyclic organic acid anhydride", and "cyclic acid anhydride" are used interchangeably herein. A cyclic organic anhydride herein can have a formula represented by Structure II shown below:

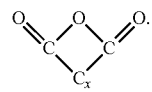

Structure II

The —$C_x$— portion of Structure II typically comprises a chain of 2 to 6 carbon atoms; each carbon atom in this chain preferably has four covalent bonds. It is contemplated that, in some embodiments, the —$C_x$— portion can comprise a chain of 2 to 16, 2 to 17, or 2 to 18 carbon atoms. During an esterification reaction herein, the anhydride group (—CO—O—CO—) of a cyclic organic anhydride breaks such that one end of the broken anhydride becomes a —COOH group and the other end is esterified to a hydroxyl group of poly alpha-1,3-glucan, thereby rendering an esterified first group (—CO—$C_x$—COOH). Depending on the cyclic organic anhydride used, there typically can be one or two possible products of such an esterification reaction.

Each R group in the formula of a poly alpha-1,3-glucan ester compound represented by Structure I can independently be an —H or a first group comprising —CO—$C_x$—COOH. The —$C_x$— portion of the first group typically comprise a chain of 2 to 6 carbon atoms; each of these carbon atoms is preferably involved in four covalent bonds. In general, each carbon in the chain, aside from being covalently bonded with an adjacent carbon atom(s) in the chain or a carbon atom of the flanking C═O and COOH groups, can also be bonded to hydrogen(s), a substituent group(s) such as an organic group, and/or be involved in a carbon-carbon double-bond. For example, a carbon atom in the —$C_x$— chain can be saturated (i.e., —$CH_2$—), double-bonded with an adjacent carbon atom in the —$C_x$— chain (e.g., —CH═CH—), and/or be bonded to a hydrogen and an organic group (i.e., one hydrogen is substituted with an organic group). Skilled artisans would understand how the carbon atoms of the —$C_x$— portion of a first group comprising —CO—$C_x$—COOH can typically be bonded, given that carbon has a valency of four. It is contemplated that, in some embodiments, the —$C_x$— portion of the first group can comprise a chain of 2 to 16, 2 to 17, or 2 to 18 carbon atoms.

In certain embodiments, the —$C_x$— portion of the first group (—CO—$C_x$—COOH) comprises only $CH_2$ groups. Examples of a first group in which the —$C_x$— portion comprises only $CH_2$ groups are —CO—$CH_2$—$CH_2$—COOH, —CO—$CH_2$—$CH_2$—$CH_2$—COOH, —CO—$CH_2$—$CH_2$—$CH_2$—$CH_2$—COOH, —CO—$CH_2$—$CH_2$—$CH_2$—$CH_2$—$CH_2$—COOH, and —CO—$CH_2$—$CH_2$—$CH_2$—$CH_2$—$CH_2$—$CH_2$—COOH. These first groups can be derived, respectively, by reacting succinic anhydride, glutaric anhydride, adipic anhydride, pimelic anhydride, or suberic anhydride with poly alpha-1,3-glucan.

The —$C_x$— portion of the first group (—CO—$C_x$—COOH) in some aspects can comprise (i) at least one double-bond in the carbon atom chain, and/or (ii) at least one branch comprising an organic group. For instance, the —$C_x$— portion of the first group can have at least one double-bond in the carbon atom chain. Examples of a first group in which the —$C_x$— portion comprises a carbon-carbon double-bond include —CO—CH═CH—COOH, —CO—CH═CH—$CH_2$—COOH, —CO—CH═CH—

CH₂—CH₂—COOH, —CO—CH=CH—CH₂—CH₂—CH₂—COOH, —CO—CH=CH—CH₂—CH₂—CH₂—CH₂—COOH, —CO—CH₂—CH=CH—COOH, —CO—CH₂—CH=CH—CH₂—COOH, —CO—CH₂—CH=CH—CH₂—CH₂—COOH, —CO—CH₂—CH=CH—CH₂—CH₂—CH₂—COOH, —CO—CH₂—CH=CH—COOH, —CO—CH₂—CH₂—CH=CH—CH₂—COOH, —CO—CH₂—CH₂—CH=CH—CH₂—CH₂—COOH, —CO—CH₂—CH₂—CH=CH—COOH, —CO—CH₂—CH₂—CH₂—CH=CH—COOH, and —CO—CH₂—CH₂—CH₂—CH₂—CH=CH—COOH. Each of these first groups can be derived by reacting the appropriate cyclic organic anhydride with poly alpha-1,3-glucan. For example, to produce a first group comprising —CO—CH=CH—COOH, maleic anhydride can be reacted with poly alpha-1,3-glucan. Thus, a cyclic organic anhydride comprising a —C$_x$— portion represented in any of the above-listed first groups (where the corresponding —C$_x$— portion of a cyclic organic anhydride is that portion linking each side of the anhydride group [—CO—O—CO—] together to form a cycle) can be reacted with poly alpha-1,3-glucan to produce an ester thereof having the corresponding first group (—CO—C$_x$—COOH).

The —C$_x$— portion of the first group (—CO—C$_x$—COOH) in some aspects herein can comprise at least one branch comprising an organic group. Examples of a first group in which the —C$_x$— portion comprises at least one organic group branch include:

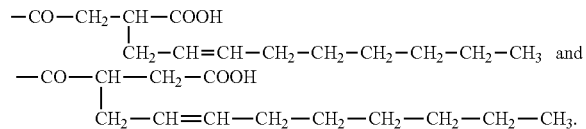

Each of these two first groups can be derived by reacting 2-nonen-1-yl succinic anhydride with poly alpha-1,3-glucan. It can be seen that the organic group branch (generically termed "R$^b$" herein) in both these examples is —CH₂—CH=CH—CH₂—CH₂—CH₂—CH₂—CH₃. It can also be seen that the R$^b$ group substitutes for a hydrogen in the —C$_x$— carbon chain.

Thus, for example, a first group (—CO—C$_x$—COOH) herein can be any of —CO—CH₂—CH₂—COOH, —CO—CH₂—CH₂—CH₂—COOH, —CO—CH₂—CH₂—CH₂—CH₂—COOH, —CO—CH₂—CH₂—CH₂—CH₂—CH₂—COOH, or —CO—CH₂—CH₂—CH₂—CH₂—CH₂—CH₂—COOH, but in which at least one, two, three, or more hydrogens thereof is/are substituted with an R$^b$ group. Also for example, a first group (—CO—C$_x$—COOH) herein can be any of —CO—CH=CH—CH₂—COOH, —CO—CH=CH—CH₂—CH₂—COOH, —CO—CH=CH—CH₂—CH₂—CH₂—COOH, —CO—CH=CH—CH₂—CH₂—CH₂—CH₂—COOH, —CO—CH₂—CH=CH—CH₂—COOH, —CO—CH₂—CH=CH—CH₂—CH₂—COOH, —CO—CH₂—CH=CH—CH₂—CH₂—CH₂—COOH, —CO—CH₂—CH=CH—COOH, —CO—CH₂—CH₂—CH=CH—COOH, —CO—CH₂—CH₂—CH=CH—CH₂—COOH, —CO—CH₂—CH₂—CH=CH—CH₂—CH₂—COOH, —CO—CH₂—CH₂—CH=CH—CH₂—COOH, or —CO—CH₂—CH₂—CH₂—CH=CH—COOH, but in which at least one, two, three, or more hydrogens thereof is/are substituted with an R$^b$ group (such first groups are examples in which the —C$_x$— portion comprises at least one double-bond in the carbon atom chain and at least one branch comprising an organic group). Suitable examples of R$^b$ groups herein include alkyl groups and alkenyl groups. An alkyl group herein can comprise 1-18 carbons (linear or branched), for example (e.g., methyl, ethyl, propyl, butyl, pentyl, hexyl, heptyl, octyl, nonyl, or decyl group). An alkenyl group herein can comprise 1-18 carbons (linear or branched), for example (e.g., methylene, ethenyl, propenyl, butenyl, pentenyl, hexenyl, heptenyl, octenyl [e.g., 2-octenyl], nonenyl [e.g., 2-nonenyl], or decenyl group). One of skill in the art would understand, based on the formula of the cyclic organic anhydride represented by Structure II and its involvement in the esterification process to prepare poly alpha-1,3-glucan esters of Structure I herein as disclosed in WO 2017/003808, what particular cyclic organic anhydride is suitable for deriving any of these first groups.

Examples of cyclic organic anhydrides by name that can be included in a reaction with poly alpha-1,3-glucan to form a poly alpha-1,3-glucan ester compound represented by Structure I include maleic anhydride, methylsuccinic anhydride, methylmaleic anhydride, dimethylmaleic anhydride, 2-ethyl-3-methylmaleic anhydride, 2-hexyl-3-methylmaleic anhydride, 2-ethyl-3-methyl-2-pentenedioic anhydride, itaconic anhydride (2-methylenesuccinic anhydride), 2-nonen-1-yl succinic anhydride, and 2-octen-1-yl succinic anhydride. Alkenyl succinic anhydrides and alkylketene dimer can also be used. In particular, for example, maleic anhydride can be used to esterify —CO—CH=CH—COOH as a first group to poly alpha-1,3-glucan; methylsuccinic anhydride can be used to esterify —CO—CH₂—CH(CH₃)—COOH and/or —CO—CH(CH₃)—CH₂—COOH as a first group to poly alpha-1,3-glucan; methylmaleic anhydride can be used to esterify —CO—CH=C(CH₃)—COOH and/or —CO—C(CH₃)=CH—COOH as a first group to poly alpha-1,3-glucan; dimethylmaleic anhydride can be used to esterify —CO—C(CH₃)=C(CH₃)—COOH as a first group to poly alpha-1,3-glucan; 2-ethyl-3-methylmaleic anhydride can be used to esterify —CO—C(CH₂CH₃)=C(CH₃)—COOH and/or —CO—C(CH₃)=C(CH₂CH₃)—COOH as a first group to poly alpha-1,3-glucan; 2-hexyl-3-methylmaleic anhydride can be used to esterify —CO—C(CH₂CH₂CH₂CH₂CH₂CH₃)=C(CH₃)—COOH and/or —CO—C(CH₃)=C(CH₂CH₂CH₂CH₂CH₂CH₃)—COOH as a first group to poly alpha-1,3-glucan; itaconic anhydride can be used to esterify —CO—CH₂—C(CH₂)—COOH and/or —CO—C(CH₂)—CH₂—COOH as a first group to poly alpha-1,3-glucan; 2-nonen-1-yl succinic anhydride can be used to esterify —CO—CH₂—CH(CH₂CH=CHCH₂CH₂CH₂CH₂CH₃)—COOH and/or —CO—CH(CH₂CH=CHCH₂CH₂CH₂CH₂CH₃)—CH₂—COOH as a first group to poly alpha-1,3-glucan.

As disclosed in WO 2017/003808, each of these first groups comprising a —C$_x$— portion with at least one organic group branch can be derived by reacting the appropriate cyclic organic anhydride with poly alpha-1,3-glucan. An example of using 2-nonen-1-yl succinic anhydride is described above. Another illustrative example includes using methylsuccinic anhydride to ester-derivatize poly alpha-1,3-glucan, where the resultant first group is —CO—CH₂—CH(CH₃)—COOH or —CO—CH(CH₃)—CH₂—COOH. Still another illustrative example includes using methylmaleic anhydride to ester-derivatize poly alpha-1,3-glucan, where the resultant first group is —CO—CH=C(CH₃)—COOH or —CO—C(CH₃)=CH—COOH. Still another illustrative example includes using itaconic anhydride (2-methylenesuccinic anhydride) to ester-derivatize poly alpha-1,3-glucan, where the resultant first group is —CO—CH$_2$—C(CH$_2$)—COOH or —CO—C(CH$_2$)—CH$_2$—COOH. Thus, a cyclic organic anhydride comprising a —C$_x$— portion represented in any of the above-listed first groups (where the corresponding —C$_x$— portion of a cyclic organic anhydride is that portion linking each side of the anhydride group [—CO—O—CO—] together to form a cycle) can be reacted with poly alpha-1,3-glucan to produce an ester thereof having the corresponding first group (—CO—C$_x$—COOH).

Poly alpha-1,3-glucan ester compounds in certain embodiments can contain one type of a first group comprising —CO—C$_x$—COOH. For example, one or more R groups ester-linked to the glucose group in the above formula may be —CO—CH$_2$—CH$_2$—COOH; the R groups in this particular example would thus independently be hydrogen and —CO—CH$_2$—CH$_2$—COOH groups (such an ester compound can be referred to as poly alpha-1,3-glucan succinate). As another example, one or more R groups ester-linked to the glucose group in the above formula may be —CO—CH=CH—COOH; the R groups in this particular example would thus independently be hydrogen and —CO—CH=CH—COOH groups (such an ester compound can be referred to as poly alpha-1,3-glucan maleate).

Alternatively, poly alpha-1,3-glucan ester compounds can contain two or more different types of a first group comprising —CO—C$_x$—COOH (i.e., they can be mixed esters). Examples of such poly alpha-1,3-glucan mixed ester compounds can contain —CO—CH$_2$—CH$_2$—COOH and —CO—CH=CH—COOH as first groups (such an ester compound can be referred to as poly alpha-1,3-glucan succinate maleate). Other examples of such compounds contain both of the following first groups:

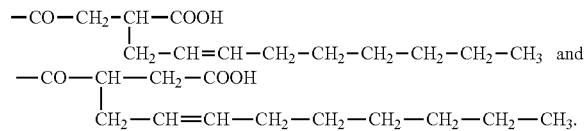

These two first groups can be derived by reacting a single cyclic organic anhydride (2-nonen-1-yl succinic anhydride) with poly alpha-1,3-glucan. Thus, it would be understood that certain cyclic organic anhydrides, when used to ester-derivatize poly alpha-1,3-glucan, can yield two different esterified first groups, since there are two ways, structurally speaking, in which the cyclic anhydride can react with glucan hydroxyl groups.

One, two, three, or more cyclic organic anhydrides can be used in an esterification reaction, if desired, to provide a mixture of poly alpha-1,3-glucan esters of Structure I. The amount of cyclic organic anhydride(s) in an esterification reaction can be selected to provide a composition comprising a poly alpha-1,3-glucan ester compound(s) having the desired degree of substitution with the first group(s).

Those skilled in the art would understand that in certain embodiments herein, a poly alpha-1,3-glucan ester compound can be in an anionic form under aqueous conditions. This anionic behavior is due to the presence of a carboxyl group (COOH) in the esterified first group (—CO—C$_x$—COOH). Carboxyl (COOH) groups of a poly alpha-1,3-glucan ester compound herein can convert to carboxylate (COO$^-$) groups in aqueous conditions. These anionic groups can interact with salt cations such as potassium, sodium, or lithium cations, if present.

In one embodiment, a poly alpha-1,3-glucan ester compound represented by Structure I as disclosed herein comprises poly alpha-1,3-glucan succinate, poly alpha-1,3-glucan methylsuccinate, poly alpha-1,3-glucan 2-methylene succinate, poly alpha-1,3-glucan maleate, poly alpha-1,3-glucan methylmaleate, poly alpha-1,3-glucan dimethyl maleate, poly alpha-1,3-glucan 2-ethyl-3-methyl maleate, poly alpha-1,3-glucan 2-hexyl-3-methyl maleate, poly alpha-1,3-glucan 2-ethyl-3-methylglutaconate, poly alpha-1,3-glucan 2-nonen-1-yl-succinate, poly alpha-1,3-glucan 2-octene-1-yl succinate, or mixtures thereof. In another embodiment, the poly alpha-1,3-glucan ester compound represented by Structure I comprises poly alpha-1,3-glucan succinate.

A poly alpha-1,3-glucan ester compound represented by Structure I can have at least about 50%, 60%, 70%, 80%, 90%, 95%, 96%, 97%, 98%, 99%, or 100% (or any integer between 50% and 100%) glycosidic linkages that are alpha-1,3. In such embodiments, accordingly, the poly alpha-1,3-glucan ester compound has less than about 50%, 40%, 30%, 20%, 10%, 5%, 4%, 3%, 2%, 1%, or 0% (or any integer value between 0% and 50%) of glycosidic linkages that are not alpha-1,3. A poly alpha-1,3-glucan ester compound preferably has at least about 98%, 99%, or 100% glycosidic linkages that are alpha-1,3.

The backbone of a poly alpha-1,3-glucan ester compound herein is preferably linear/unbranched. In certain embodiments, the compound has no branch points or less than about 10%, 9%, 8%, 7%, 6%, 5%, 4%, 3%, 2%, or 1% branch points as a percent of the glycosidic linkages in the polymer. Examples of branch points include alpha-1,6 branch points.

The formula of a poly alpha-1,3-glucan ester compound in certain embodiments can have an n value of at least 6. Alternatively, n can have a value of at least 10, 50, 100, 200, 300, 400, 500, 600, 700, 800, 900, 1000, 1100, 1200, 1300, 1400, 1500, 1600, 1700, 1800, 1900, 2000, 2100, 2200, 2300, 2400, 2500, 2600, 2700, 2800, 2900, 3000, 3100, 3200, 3300, 3400, 3500, 3600, 3700, 3800, 3900, or 4000 (or any integer between 10 and 4000), for example. The value of n in still other examples can be in a range of 25-250, 50-250, 75-250, 100-250, 150-250, 200-250, 25-200, 50-200, 75-200, 100-200, 150-200, 25-150, 50-150, 75-150, 100-150, 25-100, 50-100, 75-100, 25-75, 50-75, or 25-50.

The molecular weight of a poly alpha-1,3-glucan ester compound disclosed herein can be measured as number-average molecular weight ($M_n$) or as weight-average molecular weight ($M_w$). Alternatively, molecular weight can be measured in Daltons or grams/mole. It may also be useful to refer to the $DP_w$ (weight average degree of polymerization) or $DP_n$ (number average degree of polymerization) of the poly alpha-1,3-glucan polymer component of the compound. The $M_n$ or $M_w$ of a poly alpha-1,3-glucan ester compound herein can be at least about 1000, for example. Alternatively, the $M_n$ or $M_w$ can be at least about 1000 to about 600000. Alternatively still, the $M_n$ or $M_w$ can be at least about 10000, 25000, 50000, 75000, 100000, 125000, 150000, 175000, 200000, 225000, 250000, 275000, or 300000 (or any integer between 10000 and 300000), for example.

The term "degree of substitution" (DoS) as used herein refers to the average number of hydroxyl groups substituted in each monomeric unit (glucose) of a poly alpha-1,3-glucan ester compound. Poly alpha-1,3-glucan ester compounds useful in preparing molded articles as disclosed herein can have a degree of substitution (DoS) with one or more first groups (—CO—$C_x$—COOH) of about 0.001 to about 1.5, for example 0.001, 0.005, 0.01, 0.05, 0.1, 0.2, 0.3, 0.4, 0.5, 0.6, 0.7, 0.8, 0.9, 1, 1.1, 1.2, 1.3, 1.4, 1.5, or any value between 0.001 and 1.5. Alternatively, the DoS of a poly alpha-1,3-glucan ester compound can be about 0.001 to about 0.1, for example 0.001, 0.005, 0.01, 0.02, 0.03, 0.04, 0.05, 0.06, 0.07, 0.08, 0.09, 0.1, for example, or any value between 0.001 and 0.1. Alternatively still, it is believed that poly alpha-1,3-glucan ester compounds useful in preparing molded articles can have a DoS of about 0.001 to about 3. The DoS can optionally be expressed as a range between these values. It would be understood by those skilled in the art that, since a poly alpha-1,3-glucan ester compound herein has a degree of substitution between about 0.001 to about 1.5, the R groups of the compound cannot only be hydrogen. The structure, molecular weight, and DoS of a poly alpha-1,3-glucan ester product can be confirmed using various physiochemical analyses known in the art such as NMR spectroscopy and size exclusion chromatography (SEC).

In another embodiment, the polysaccharide comprises a nanostructured polysaccharide characterized by a surface area in the range of from about 0.1 $m^2/g$ to about 200 $m^2/g$, as determined by the Brunauer-Emmett-Teller (BET) measurement method. For example, the BET surface area can be 0.1, 0.2, 0.3, 0.4, 0.5, 0.6, 0.7, 0.8, 0.9, 1, 2, 3, 4, 5, 6, 7, 8, 9, 10, 15, 20 25, 30 35, 40 45, 50, 55, 60, 65, 70, 75, 80, 85, 90, 95, 100, 110, 120, 130, 140, 150, 160, 170, 180, 190, or 200 (or any value between 0.1 and 200) $m^2/g$.

In yet another embodiment, the molded articles disclosed herein comprise a polysaccharide having an average particle size in at least one dimension in the range of from about 20 nm to about 800 μm (800,000 nm). For example, the average particle size in at least one dimension can be 20; 30; 40; 50; 60; 70; 80; 90; 100; 150; 200; 250; 300; 350; 400; 450; 500; 550; 600; 700; 800; 900; 1000; 1500; 2000; 2500; 5000; 7500; 10,000; 15,000; 20,000; 30,000; 40,000; 50,000; 60,000; 70,000; 80,000; 90,000; 100,000; 125,000; 150,000; 175,000; 200,000; 250,000; 300,000; 350,000; 400,000; 450,000; 500,000; 550,000; 600,000; 650,000; 700,000; 750,000; or 800,000 (or any value between 20 and 800,000) nm. In a further embodiment, the molded articles comprise a polysaccharide, wherein the polysaccharide comprises particles having an average particle size in at least one dimension in the range of from about 20 nm to about 800 μm (800,000 nm) and an aspect ratio of about 1.

In a further embodiment, the polysaccharide comprises an enzymatically-produced polysaccharide. Examples of enzymatically-produced polysaccharide include poly alpha-1,3-glucan; poly alpha-1,3-1,6-glucan; and a graft copolymer that comprises: (A) a backbone comprising dextran with a weight-average molecular weight (Mw) of at least about 100000 Daltons, and (B) poly alpha-1,3-glucan side chains comprising at least about 95% alpha-1,3-glucosidic linkages. Enzymatic methods for the production of poly alpha-1,3-glucan are described in U.S. Pat. Nos. 7,000,000; 8,642,757; and 9,080,195, for example. Enzymatic production of poly alpha-1,3-1,6-glucan is disclosed in United States Patent Application Publication 2015/0232785 A1.

The polysaccharides can be used in any useful amount, for example an amount sufficient to impart the desired properties to the molded article. In one embodiment, the molded article comprises from about 60 weight percent to about 100 weight percent polysaccharide, based on the total weight of the article. For example, the molded article can comprise 60, 65, 70, 75, 80, 85, 90, 95, 96, 97, 98, 99, or 100 weight percent polysaccharide, based on the total weight of the article. If desired, the polysaccharide can be used in an amount less than 60 weight percent of the total weight of the molded article. In other embodiments, the molded article comprises polysaccharide and at least one additional component, for example starch, and the molded article comprises from about 10 to about 20 weight percent polysaccharide, based on the total weight of the article. For example, when an additional component is included, the molded article can comprise 10, 11, 12, 13, 14, 15, 16, 17, 18, 19, or 20 weight percent polysaccharide, based on the total weight of the article.

In another embodiment, the molded article may further comprise inorganic particles. In one embodiment, the molded article further comprises inorganic particles selected from titanium dioxide, calcium carbonate, mica, vermiculite, silica, kaolin, talc, or a mixture thereof. The silica may be fumed silica or precipitated silica. Addition of these inorganic particles to the polysaccharide and the plasticizer, if used, can impart properties such as brightness, reduced cost via use of a filler, and improved barrier properties to the composite. In one embodiment, the inorganic particles comprise titanium dioxide. In another embodiment, the inorganic particles comprise calcium carbonate. In an additional embodiment, the inorganic particles comprise mica. In yet another embodiment, the inorganic particles comprise vermiculite. In a further embodiment, the inorganic particles comprise silica. In an alternative embodiment, the inorganic particles comprise kaolin. In yet an additional alternative embodiment, the inorganic particles comprise talc.

In yet another embodiment, the molded article further comprises carbon black. In a further embodiment, the molded article comprises carbon black and/or inorganic particles selected from titanium dioxide, calcium carbonate, mica, vermiculite, silica, kaolin, talc, or a mixture thereof.

The molded article can further comprise starch. Starch is a polysaccharide produced by plants and is the main energy store. It occurs in nature as water insoluble granules composed of two main polysaccharides, amylose and amylopectin. In typical forms of starch, the amylose content in starch ranges from 30%-7%. Potato starch has 30% amylose, tapioca, 22%, cassava, wheat and corn 20%, rice 7%. Through genetic modification, the composition of the starch can be modified to produce predominantly amylopectin. The starch can be used as a filler, in an amount which does not negatively impact the properties of the molded article.

In one embodiment, the molded article comprises from about 1 weight percent to about 50 weight percent starch, based on the total weight of the article. For example, the article can comprise 1, 2, 3, 4, 5, 6, 7, 8, 9, 10, 15, 20, 25, 30, 35, 40, 45, or 50 weight percent (or any value in between) starch. In another embodiment, the molded article can comprise from about 50 weight percent to about 80 weight percent starch, based on the total weight of the article. For example, the article can comprise 50, 55, 60, 65, 70, 75, or 80 weight percent (or any value in between) starch. In another embodiment, the molded article is substantially free of starch, containing less than about 5%, 4%, 3%, 2%, or 1% starch by weight, based on the total weight of polysaccharide, starch, and plasticizer, if present.

The molded article can further comprise a plasticizer. A variety of plasticizers are useful in combination with the polysaccharides disclosed herein, including fructose, sorbitol, sucrose, glycerol, polyethylene glycol (PEG) having a number average molecular weight from about 100 to about 2000 g/mole, triethylene glycol, methyl lactate, ethyl lactate, sodium lactate, inulin, diglycerol, triglycerol, maltodextrin 6, propylene glycol, propylene carbonate, dimethyl ether isosorbide, methyl levulinate, methyl urea, gamma-valerolactone, triethyl citrate, glycerol monoacetate, glycerol diacetate, glycerol triacetate, water, or combinations thereof. The plasticizer can also comprise esters of stearic acid, adipic acid, citric acid, or mixtures thereof. In one embodiment, the plasticizer comprises glycerol tristearate. In one embodiment, the plasticizer comprises glycerol. In one embodiment, the plasticizer comprises water. In one embodiment, the plasticizer comprises diacetin. In one embodiment, the plasticizer comprises fructose. In one embodiment, the plasticizer comprises sorbitol. In one embodiment, the plasticizer comprises sucrose.

Reactive plasticizers, for example acid anhydrides, epoxides, or aldehydes, may also be used.

In one embodiment, the molded article comprises polysaccharide and a plasticizer, wherein the polysaccharide comprises poly alpha-1,3-glucan and the plasticizer comprise glycerol. In another embodiment, the molded article comprises polysaccharide and a plasticizer, wherein the polysaccharide comprises poly alpha-1,3-glucan and the plasticizer comprises water. In an additional embodiment, the molded article comprises polysaccharide and a plasticizer, wherein the polysaccharide comprises poly alpha-1,3-glucan and the plasticizer comprises glycerol, water, or a combination thereof.

In one embodiment, the molded article comprises polysaccharide and a plasticizer, wherein the polysaccharide comprises poly alpha-1,3-1,6-glucan and the plasticizer comprise glycerol. In another embodiment, the molded article comprises polysaccharide and a plasticizer, wherein the polysaccharide comprises poly alpha-1,3-1,6-glucan and the plasticizer comprise water.

In one embodiment, the molded article comprises polysaccharide and a plasticizer, wherein the polysaccharide comprises a graft copolymer that comprises a) a backbone comprising dextran with a weight-average molecular weight (Mw) of at least about 100000 Daltons, and b) poly alpha-1,3-glucan side chains comprising at least about 95% alpha-1,3-glucosidic linkages, and the plasticizer comprise glycerol. In another embodiment, the molded article comprises polysaccharide and a plasticizer, wherein the polysaccharide comprises a graft copolymer that comprises a) a backbone comprising dextran with a weight-average molecular weight (Mw) of at least about 100000 Daltons, and b) poly alpha-1,3-glucan side chains comprising at least about 95% alpha-1,3-glucosidic linkages, and the plasticizer comprise water.

In one embodiment, the molded article comprises from about 1 weight percent to about 60 weight percent plasticizer, based on the total weight of the article. For example, the article can comprise 1, 2, 3, 4, 5, 6, 7, 8, 9, 10, 15, 20, 25, 30, 35, 40, 45, 50, 55, or 60 weight percent (or any value in between) plasticizer.

In one embodiment, the molded article comprises polysaccharide, starch, and plasticizer. In an embodiment, the molded article comprises polysaccharide, starch, and plasticizer, and the article comprises from about 1 weight percent to about 50 weight percent starch, based on the total weight of the article. In another embodiment, the molded article comprises polysaccharide, starch, and plasticizer, and the article comprises from about 10 weight percent to about 20 weight percent polysaccharide, from about 50 weight percent to about 80 weight percent starch, and from about 10 weight percent to about 40 weight percent plasticizer.

In one embodiment, the molded article comprises poly alpha-1,3-glucan and plasticizer. In one embodiment, the molded article comprises poly alpha-1,3-glucan and starch. In one embodiment, the molded article comprises poly alpha-1,3-glucan, starch, and plasticizer.

In a further embodiment, the molded article can further comprise a crosslinking agent. It is believed that crosslinking agents could be used to provide improved oxygen barrier and/or water vapor barrier properties to the molded article. Useful crosslinking agents could include at least one of maleic anhydride, methylsuccinic anhydride, methylmaleic anhydride, dimethylmaleic anhydride, 2-ethyl-3-methylmaleic anhydride, 2-hexyl-3-methylmaleic anhydride, 2-ethyl-3-methyl-2-pentenedioic anhydride, itaconic anhydride (2-methylenesuccinic anhydride), 2-nonen-1-yl succinic anhydride, 2-octen-1-yl succinic anhydride, alkenyl succinic anhydride, and alkylketene dimers, for example those derived from palmitic acid or other long chain carboxylic acids. It is believed the cross-linking agents could be combined with the polysaccharide in any useful amount, prior to the molding step.

In yet another embodiment, the molded article can further comprise a pigment, a nucleating agent, and/or other processing aids and additives.

Molded articles comprising polysaccharides as disclosed herein can be prepared by compression molding processes in which the polysaccharide and any other selected ingredients are placed between metal plates, or in a mold, and heated while pressure is applied for short time periods, typically for time periods ranging from less than a minute to a few minutes, for example for a time period of about 15 seconds to about 15 minutes. For example, the time period can be from about 15 seconds to about 60 seconds, or from about 15 seconds to about 2 minutes, or from about 15 seconds to about 3 minutes, or from about 15 seconds to about 4 minutes, or from about 15 seconds to about 5 minutes, or from about 15 seconds to about 10 minutes, or from about 15 seconds to about 15 minutes. Under appropriate conditions, an article is formed from the polymer. If necessary, more than one cycle of applying and releasing pressure can be used.

In one embodiment, the molded articles disclosed herein can be prepared by a compression molding process comprising the steps of:

a) combining a polysaccharide and a plasticizer, and optionally starch to form a mixture;

b) heating the mixture to a temperature in the range of from about 140° C. to about 220° C. while applying pressure in the range of from about 0.5 MPa (40,000 N) to about 25 MPa (1,400,000 N). After sufficient time at temperature and pressure, a molded article is formed. The temperature and pressure are reduced and the molded article obtained. At least a portion of any water present with the polysaccharide, or added as a plasticizer, is typically removed in the molding process. At least a portion of any added plasticizer, if sufficiently volatile, may also be removed in the molding process. As known in the art, various templates can be used to provide a desired shape to the molded article.

The temperature during the molding process is in the range of from about 140° C. to about 220° C., for example 140° C., 145° C., 150° C., 155° C., 160° C., 165° C., 170° C., 175° C., 180° C., 185° C., 190° C., 195° C., 200° C., 205° C., 210° C., 215° C., or 220° C., or any temperature in between. A single temperature can be maintained during the molding process, or the temperature can be varied within the range of from about 140° C. to about 220° C.

During the molding process, the mixture of polysaccharide and optionally a plasticizer, starch, or a combination thereof, and any additives such as inorganic particles, is subjected to pressure in the range of from about 0.5 MPa to about 25 MPa, for example 0.5, 1, 2, 3, 4, 5, 6, 7, 8, 9, 10, 11, 12, 13, 14, 15, 16, 17, 18, 19, 20, 21, 22, 23, 24, or 25 MPa, or any pressure in between.

In one embodiment, during the process of preparing a molded article comprising a polysaccharide as disclosed herein, the molecular weight of the polysaccharide is maintained and not reduced. In another embodiment, during the process of preparing a molded article, the molecular weight of the polysaccharide increases, which can be useful as this can impart increased mechanical stability to the molded article.

As disclosed herein, the polysaccharide used in a process to prepare a molded article comprises:
 i) poly alpha-1,3-glucan;
 ii) poly alpha-1,3-1,6-glucan; or
 iii) a graft copolymer that comprises:
  (A) a backbone comprising dextran with a weight-average molecular weight (Mw) of at least about 100000 Daltons, and
  (B) poly alpha-1,3-glucan side chains comprising at least about 95% alpha-1,3-glucosidic linkages; or
 iv) a composition comprising a poly alpha-1,3-glucan ester compound represented by Structure I:

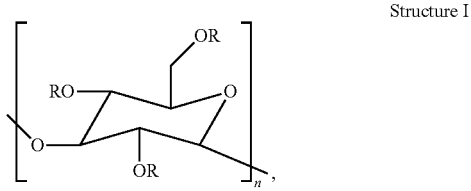

Structure I wherein
 (A) n is at least 6;
 (B) each R is independently an —H or a first group comprising —CO—$C_x$—COOH, wherein the —$C_x$— portion of said first group comprises a chain of 2 to 6 carbon atoms; and
 (C) the ester compound has a degree of substitution with the first group of about 0.001 to about 1.5.

To make a molded article as disclosed herein above, the polysaccharide is typically used as wet cake containing greater than 5% by weight of water, or as dry powder containing less than about 10%, or less than about 5%, by weight water. In some embodiments, the polysaccharide is used in fibrid form.

The amount of water present with the polysaccharide when the polysaccharide is used in the form of wet cake or undried fibrids can be sufficient that additional water or additional plasticizer is not needed to form a molded article. It may be desirable to "de-water" polysaccharide wet cake or undried polysaccharide fibrids, that is, to reduce the amount of water present with the polysaccharide, so that a molded article produced from the wet cake or undried fibrids does not rupture during the compression molding process. Depending on the amount of water present with the polysaccharide when the polysaccharide is used in the form of dry powder, additional water and/or plasticizer may be needed to form a molded article.

The term "fibrids", as used herein, means nongranular, fibrous or film-like particles with at least one of their three dimensions being of minor magnitude relative to the largest dimension. In some embodiments, the poly alpha-1,3-glucan or other polysaccharide can have a fiber-like and/or a sheet-like structure with a relatively large surface area when compared to a fiber. The surface area can be in the range of 5 to 50 meter$^2$/gram of material, with the largest dimension particle size of about 10 to 1000 micrometers and the smallest dimension size, length or thickness of 0.05 to 0.25 micrometers, resulting in an aspect ratio of largest to smallest dimension of 40 to 20,000.

Fibrids can be prepared by precipitation of a solution of polymeric material such as poly alpha-1,3-glucan or other polysaccharide using a non-solvent under shear, preferably, high shear, for example as disclosed in published patent application WO 2016/196022, which is incorporated herein by reference in its entirety. The term "non-solvent" as used herein means that it is a poor solvent for the polymeric material, for example, the polymeric material has a solubility of less than 5 wt % in the solvent. In other embodiments, the polymeric material can have a solubility of less than 4, 3, 2, 1 or 0.5 wt % in the solvent. Examples of suitable non-solvents for the poly alpha-1,3-glucan or other polysaccharide include, for example, methanol, ethanol, isopropanol, acetone, aqueous acidic solution, water, etc.

Fibrids can be made by a process comprising:
 (a) dissolving poly alpha-1,3-glucan or other polysaccharide in a solvent to make a poly alpha-1,3-glucan or other polysaccharide solution;
 (b) precipitating poly alpha-1,3-glucan fibrids or other polysaccharide fibrids under shear to produce a suspension containing the fibrids.

Fibrids can also be made by the addition of a poly alpha-1,3-glucan solution or other polysaccharide solution into a precipitating bath of liquid ("non-solvent"). The addition of the poly alpha-1,3-glucan solution or other polysaccharide solution into the precipitating bath can be accomplished using any standards methods known to those skilled in the art. For example, direct injection can be used.

During the addition, the stream of polymer solution is subjected to shearing forces and turbulence causing the fibrids to precipitate in the form of a suspension by using a non-solvent (i.e., a liquid that has a solubility for the poly alpha-1,3-glucan or other saccharide of less than 5 wt %), in other words, that is immiscible with poly alpha-1,3-glucan or other saccharide. In some embodiments, the precipitating bath can comprise acid or alkali aqueous solution or alcohol.

It is possible to control (i) the viscosity of the suspension containing fibrids (ii) the size and/or (iii) the shape of the fibrids by controlling one or more process parameters such as, for example, the dope concentration, the type of solvent, the type of mixer, the mixing speed, the pH of precipitation bath, the rate of addition of the solution containing polymer, the amount of non-solvent used, the duration of mixing, the neutralization rate and the concentration of neutralizer.

The term "dope" as used herein refers to solution containing polymer. A dope can be prepared by mixing polymer into a solvent. Thus, as well known to those skilled in the art, dope concentration refers to the amount of polymer mixed into the solvent.

The fibrids can be isolated by filtering the suspension. Optionally, the isolated fibrids can be washed with water and/or dried.

Types of solvent for the poly alpha-1,3-glucan that can be used to practice the process include, but are not limited to, an aqueous basic solution containing components such as sodium hydroxide, potassium hydroxide, lithium hydroxide, lithium chloride/DMAC, DMSO/lithium chloride, etc. The solvent for the poly alpha-1,3-glucan or other polysaccharide should be miscible with the liquid used for the precipitation bath. The mixing speed and the duration of mixing can be adjusted as desired. The pH of the precipitation bath can be adjusted from acidic to neutral to basic depending upon the solvent chosen in which to mix the poly alpha-1,3-glucan or other polysaccharide.

The molded articles disclosed herein can be useful in various applications. For example, the molded article can be a container, a handle, packaging, a tray, a bottle, a cup, a sheet, a disposable food packaging item, an automotive part, a casing for an electronic device, or a toy. In one embodiment, articles comprising polysaccharides as disclosed herein include rigid packaging, for example disposable food packaging or handling items. Examples of rigid packages also include bottles, jars, ready meal trays, trays, cosmetic containers, squeezable tubes, and thin walled containers often used as a secondary package in electronics and confectionaries. Molded articles comprising polysaccharides as disclosed herein can provide improved mechanical properties, the ability to make thinner walled-containers while having desired properties, contact transparency, improved barrier performance, improved water resistance, improved hydrocarbon resistance, improved wetting, and improved aesthetics such as surface gloss as compared to comparable molded articles made from incumbent materials and free of polysaccharides. Molded articles comprising polysaccharides as disclosed herein can also have oxygen barrier properties and or water vapor barrier properties, both of which are beneficial in various end uses, for example in food packaging.

Non-limiting examples of molded articles and processes disclosed herein include:

1. A molded article comprising; a polysaccharide, wherein the polysaccharide comprises
   i) poly alpha-1,3-glucan;
   ii) poly alpha-1,3-1,6-glucan;
   iii) a graft copolymer that comprises:
      (A) a backbone comprising dextran with a weight-average molecular weight (Mw) of at least about 100000 Daltons, and
      (B) poly alpha-1,3-glucan side chains comprising at least about 95% alpha-1,3-glucosidic linkages; or
   iv) a composition comprising a poly alpha-1,3-glucan ester compound represented by Structure I:

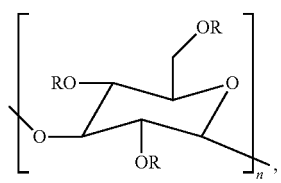

Structure I wherein
(A) n is at least 6;
(B) each R is independently an —H or a first group comprising —CO—$C_x$—COOH, wherein the —$C_x$— portion of said first group comprises a chain of 2 to 6 carbon atoms; and
(C) the ester compound has a degree of substitution with the first group of about 0.001 to about 1.5.

2. The molded article of embodiment 1, wherein the polysaccharide comprises poly alpha-1,3-glucan.
3. The molded article of embodiment 1, wherein the polysaccharide comprises poly alpha-1,3-1,6-glucan.
4. The molded article of embodiment 1, wherein the polysaccharide comprises a graft copolymer that comprises:
   (A) a backbone comprising dextran with a weight-average molecular weight (Mw) of at least about 100000 Daltons, and
   (B) poly alpha-1,3-glucan side chains comprising at least about 95% alpha-1,3-glucosidic linkages.
5. The molded article of embodiment 1, wherein the polysaccharide comprises a composition comprising a poly alpha-1,3-glucan ester compound represented by Structure I:

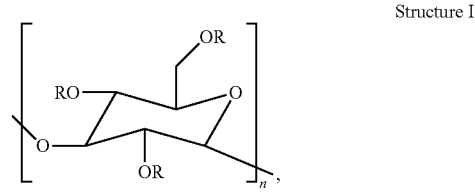

Structure I wherein
(A) n is at least 6;
(B) each R is independently an —H or a first group comprising —CO—$C_x$—COOH, wherein the —$C_x$— portion of said first group comprises a chain of 2 to 6 carbon atoms; and
(C) the ester compound has a degree of substitution with the first group of about 0.001 to about 1.5.

6. The molded article of embodiment 1, 2, 3, 4, or 5, wherein the article comprises from about 60 weight percent to about 100 weight percent polysaccharide, based on the total weight of the article.
7. The molded article of embodiment 1, 2, 3, 4, 5, or 6, further comprising starch.
8. The molded article of embodiment 1, 2, 3, 4, 5, 6, or 7, further comprising a plasticizer.
9. The molded article of embodiment 8, wherein the article comprises from about 1 weight percent to about 60 weight percent plasticizer, based on the total weight of the article.
10. The molded article of embodiment 8 or 9, wherein the plasticizer comprises fructose, sorbitol, sucrose, glycerol, polyethylene glycol having a number average molecular weight from about 100 to about 2000 g/mole, triethylene glycol, methyl lactate, ethyl lactate, sodium lactate, inulin, diglycerol, triglycerol, maltodextrin 6, propylene glycol, propylene carbonate, dimethyl ether isosorbide, methyl levulinate, methyl urea, gamma-valerolactone, triethyl citrate, glycerol monoacetate, glycerol diacetate, glycerol triacetate, water, or combinations thereof.
11. The molded article of embodiment 8, 9, or 10, further comprising starch.
12. The molded article of embodiment 1, 2, 3, 4, 5, 6, 7, 8, 9, 10, or 11, further comprising carbon black and/or inorganic particles selected from titanium dioxide, calcium carbonate, mica, vermiculite, silica, kaolin, talc, or a mixture thereof.
13. The molded article of embodiment 1, 2, 6, 7, 8, 9, 10, 11, or 12, wherein the polysaccharide comprises poly alpha-1,3-glucan, and the plasticizer comprises glycerol, water, or a mixture thereof.
14. The molded article of embodiment 1, 2, 3, 4, 5, 6, 7, 8, 9, 10, 11, 12, or 13, wherein the article is a container, a handle, packaging, a tray, a bottle, a cup, a sheet, a disposable food packaging item, an automotive part, a casing for an electronic device, or a toy.
15. A compression molding process for making a molded article, the process comprising the steps of:

a) combining a polysaccharide and a plasticizer, and optionally starch, to form a mixture;

b) heating the mixture to a temperature in the range of from about 140° C. to about 220° C. while applying pressure in the range of from about 0.5 MPa to about 25 MPa;

wherein the polysaccharide comprises:
i) poly alpha-1,3-glucan;
ii) poly alpha-1,3-1,6-glucan;
iii) a graft copolymer that comprises:
   (A) a backbone comprising dextran with a weight-average molecular weight (Mw) of at least about 100000 Daltons, and
   (B) poly alpha-1,3-glucan side chains comprising at least about 95% alpha-1,3-glucosidic linkages; or
iv) a composition comprising a poly alpha-1,3-glucan ester compound represented by Structure I:

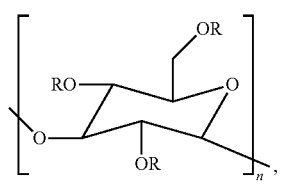

Structure I wherein
(A) n is at least 6;
(B) each R is independently an —H or a first group comprising —CO—$C_x$—COOH, wherein the —$C_x$— portion of said first group comprises a chain of 2 to 6 carbon atoms; and
(C) the ester compound has a degree of substitution with the first group of about 0.001 to about 1.5.

EXAMPLES

Unless otherwise noted, all materials were used as received.

As used herein, "Comp. Ex." Means Comparative Example; "Ex." means Example.

Representative Preparation of Poly Alpha-1,3-Glucan

Poly alpha-1,3-glucan can be prepared using a gtfJ enzyme preparation as described in U.S. Pat. No. 7,000,000; U.S. Patent Appl. Publ. No. 2013/0244288, now U.S. Pat. No. 9,080,195; and U.S. Patent Appl. Publ. No. 2013/0244287, now U.S. Pat. No. 8,642,757 (all of which are incorporated herein by reference in their entirety).

Poly alpha-1,3-glucan polymer can be synthesized, and wet cake thereof prepared, following the procedures disclosed in U.S. Appl. Publ. No. 2014/0179913, now U.S. Pat. No. 9,139,718 (see Example 12 therein, for example), both of which are incorporated herein by reference in their entirety.

Polysaccharide Samples

A potato starch from Emsland was used in the Comparative Examples (except for Comparative Example U).

Several polysaccharides were used to prepare the molded articles of the Examples.

Poly alpha-1,3-glucan dry powder contained 10% water. The glucan dry powder was obtained from wet cake that had been isolated as described above, dried, and sieved below 20 mesh. In some cases, glucan dry powder with a finer particle size was used. In the tables below, this material is referred to as "Glucan—dry powder".

Poly alpha-1,3-glucan wet cake contained 65% water. The glucan wet cake had been isolated as described above. In the tables below, this material is referred to as "Glucan wet cake".

Two samples of poly alpha-1,3-glucan in the form of a graft copolymer comprising (i) a backbone comprising dextran with a weight-average molecular weight (Mw) of at least about 100000 Daltons, and (ii) poly alpha-1,3-glucan side chains comprising at least about 95% alpha-1,3-glucosidic linkages were also used. One sample of dextran-poly alpha-1,3-glucan graft copolymer comprised about 10% dextran and 90% poly alpha-1,3-glucan and is referred to herein as dextran-glucan graft copolymer #1; the other sample of dextran-poly alpha-1,3-glucan graft copolymer comprised about 30% dextran and 70% poly alpha-1,3-glucan and is referred to herein as dextran-glucan graft copolymer #2. Both samples were in the form of dry powder and contained 10 weight percent water. These graft copolymer polysaccharide samples were prepared using methods similar to those disclosed in published patent application WO 2017/079595 (see Example 7 therein, for example), which is incorporated herein in its entirety.

For each of dextran-glucan graft copolymer #1 and #2, Table B provides information on the % alpha-1,6-glucosidic linkage content (determined by NMR) of the polysaccharide, as well as the weight/weight ratio of dextran to sucrose used in preparing each polysaccharide sample.

TABLE B

Graft Copolymer Polysaccharides Used

| Graft Copolymer | Alpha-1,6-Linkage Content, % | Dextran:Sucrose Ratio (wt/wt) Used in Synthesis |
|---|---|---|
| #1 | 6.5 | 0.044 |
| #2 | 20 | 0.171 |

Fructose, sorbitol, sucrose, glycerol, polyethylene glycol having average molecular weight of 200 g/mole (PEG 200), polyethylene glycol having average molecular weight (Mn) of 2000 (PEG 2000), triethylene glycol, methyl lactate, ethyl lactate, glycerol tristearate, sodium lactate, Frutafit TEX (inulin), diglycerol, triglycerol, maltodextrin 6, propylene glycol, propylene carbonate, dimethyl ether isosorbide, methyl levulinate, methyl urea, valerolactone, monoacetin (glycerol monoacetate), diacetin (glycerol diacetate), and triacetin (glycerol triacetate) were obtained from commercial sources and used as received.

Methods

Moisture content of the polysaccharides was determined using an Sartorius Moisture Analyzer (Sartorius MA40) infrared dryer.

Wide angle X-ray scattering (WAXS) powder diffractograms were recorded on a Bruker D2 Phaser diffractometer in the reflection geometry in the angular range 5-40° (2θ), with a step size of 0.02° (2θ) and an acquisition time of 2.0 s per step. The Co Kα1 radiation (λ=1.7902 Å; X-ray tube is air cooled) from the anode, was generated at 30 kV and 10 mA. The diffractometer was equipped with a 1 mm divergence slit, a 0.5 mm knife edge above the sample stage (enabling measurement at low angle, i.e. from 5° 2θ upwards) and a LINEXEYE™ Silicon-strip detector. The PSD (position sensitive detector) opening is set at 5.82 (i.e. maximum) for best signal to noise ratio.

Standard differential scanning calorimetry (DSC) techniques were used to characterize a poly alpha-1,3-glucan sample and some of the molded articles comprising poly alpha-1,3-glucan. Sample was weighed (10-20 mg) into pans and subjected to heating and cooling cycles at 10° C./min. Molded articles were analyzed from the first heat to characterize their thermal history.

Procedure for Compression Molding Articles

Samples were prepared by basing % plasticizer on dry weight of polymer, for example 5 g dry weight polymer with 1 g plasticizer for 20 weight percent plasticizer; 5 g dry weight polymer with 1.5 g plasticizer for 30 weight percent plasticizer. The polysaccharide was mixed with plasticizer and equilibrated overnight in a tube rotator. A standard PHI type hot press (PHI hydraulic press) with temperature and pressure control was used to press the compositions. Molded articles were prepared at 160° C., 180° C., and 200° C. with a duration of 5 minutes, and with pressure applied stepwise (5-10-20-40 ton) and molding using templates 5×5 cm, 1 mm thick.

Examples 1-11 and Comparative Examples

In the Tables below, an "O" indicates formation of a molded object using the materials and conditions indicated. An "R" indicates the pressure release ruptured the object. An "X" indicates an object was not formed under the conditions. For the cases indicated with "R", it is thought that the formed objects might not rupture if pressure were released differently, for example more slowly.

The following tables present the process conditions used to prepare molded articles from the various polysaccharides, with and without added plasticizer. The temperatures used in the process to prepare the molded articles are indicated in the Table titles.

Example 1

TABLE 1

Molded Articles Formed Without Plasticizer at 200° C.

| Example | Material | Formation |
|---|---|---|
| 1A | Glucan - Dry powder | O |
| 1B | Glucan - Wet cake | R |
| 1C | dextran-glucan graft copolymer #1 | O |
| 1D | dextran-glucan graft copolymer #2 | O |
| Comp. Ex. A | Potato starch 1 | O |
| Comp. Ex. B | Potato starch 2 | O |

Example 2

TABLE 2

Molded Articles Formed with 20% Plasticizer at 160° C.

| Plasticizer | Ex. | Glucan-Dry powder | Ex. | Glucan-Wet cake | Comp. Ex. | Emsland Potato starch |
|---|---|---|---|---|---|---|
| Fructose | 2A-1 | O | 2A-2 | R | C | O |
| Sorbitol | 2B-1 | O | 2B-2 | R | D | O |
| PEG 200 | 2C-1 | O | 2C-2 | R | E | O |
| Methyl lactate | 2D-1 | O | 2D-2 | R | F | O |
| Sucrose | 2E-1 | O | 2E-2 | R | G | O |
| Glycerol | 2F-1 | O | 2F-2 | R | H | O |
| Glycerol tristearate | 2G-1 | O | 2G-2 | R | I | O |
| Sodium lactate | 2H-1 | O | 2H-2 | R | J | O |

Example 3

TABLE 3

Molded Articles Formed with 20% Plasticizer at 200° C.

| Plasticizer | Ex. | Glucan-Dry powder | Ex. | Glucan-Wet cake | Comp. Ex. | Emsland Potato starch |
|---|---|---|---|---|---|---|
| Fructose | 3A-1 | O | 3A-2 | R | K | O |
| Sorbitol | 3B-1 | O | 3B-2 | R | L | O |
| PEG 200 | 3C-1 | O | 3C-2 | R | M | O |
| Methyl lactate | 3D-1 | O | 3D-2 | R | N | O |
| Sucrose | 3E-1 | O | 3E-2 | R | P | O |
| Glycerol | 3F-1 | O | 3F-2 | R | Q | O |
| Glycerol tristearate | 3G-1 | O | 3G-2 | R | S | O |
| Sodium lactate | 3H-1 | O | 3H-2 | R | T | O |

Example 4

TABLE 4

Molded Articles Formed from Glucan Dry Powder and 30% Plasticizer at 160° C.

| Example | Plastizer | Formation |
|---|---|---|
| 4A | Sorbitol | O |
| 4B | Sucrose | O |
| 4C | Fructose | O |
| 4D | Frutafit TEX (inulin) | O |
| 4E | Maltodextrin 6 | O |
| 4F | Water | O |
| 4G | PEG 200 | O |
| 4H | PEG 2000 | O |
| 4I | Triethylene glycol | O |
| 4J | Glycerol | O |
| 4K | Diglycerol | O |
| 4L | Triglycerol | O |
| 4M | Propylene glycol | O |
| 4N | Propylene carbonate | O |
| 4O | Dimethyl ether isosorbide | O |
| 4P | Methyl levulinate | O |
| 4Q | Methyl urea | O |
| 4R | Gamma-valerolactone | O |
| 4S | Sodium lactate | O |
| 4T | Methyl lactate | O |
| 4U | Ethyl lactate | O |
| 4V | Triethyl citrate | O |
| 4W | Triacetin (glycerol triacetate) | O |
| 4X | Diacetin (glycerol diacetate) | O |
| 4Y | Monoacetin (glycerol monoacetate) | O |

Example 5

TABLE 5

Molded Articles Formed with Glucan Dry Power and Range of Plasticizer Levels, at 160° C.

| Example | Plasticizer and Amount (wt %) | Formation |
| --- | --- | --- |
| 5A | No plasticizer (0%) | O |
| 5B | Diacetin (10%) | O |
| 5C | Diacetin (20%) | O |
| 5D | Diacetin (30%) | O |
| 5E | Diacetin (40%) | O |
| 5F | Diacetin (50%) | O |

Comparative Example U

TABLE 6

Attempt to Form Molded Article Using Glucan Dry Powder with Aqueous NaOH Solution. at 160° C.

| Additive and Amount | Formation |
| --- | --- |
| NaOH (20%) | X |

The negative formation result for Comparative Example U shows that under the conditions tested, a molded article was not formed.

Example 6

TABLE 7

Molded Articles Formed at Three Temperatures from Glucan Dry Powder with No Plasticizer Added

| Example | Temperature | Formation |
| --- | --- | --- |
| 6A | 160° C. | O |
| 6B | 180° C. | O |
| 6C | 200° C. | O |

Example 7

TABLE 8

Molded Articles Formed from Glucan Dry Powder with 30% Plasticizer at 200° C.

| Example | Plasticizer | Formation |
| --- | --- | --- |
| 7A | Glycerol | O |
| 7B | Diacetin | O |
| 7C | Triacetin | O |
| 7D | Dimethyl ether isosorbide | O |
| 7E | Triethyl citrate | O |

Example 8

TABLE 9

Molded Articles Formed from Glucan Dry Powder with 30% Plasticizer at 200° C.

| Example | Plasticizer | Formation |
| --- | --- | --- |
| 8A | PEG 200 | O |
| 8B | Triethyl citrate | O |
| 8C | Sodium lactate | O |

Example 9

TABLE 10

Molded Articles Formed from Glucan Dry Powder with Range of Plasticizer Level at 160° C. and 200° C.

| Example | Plasticizer and Amount | Formation |
| --- | --- | --- |
| 9A | Glycerol (10%) | O |
| 9B | Glycerol (20%) | O |
| 9C | Glycerol (30%) | O |
| 9D | Glycerol (40%) | O |
| 9E | Glycerol (50%) | O |

Example 10

TABLE 11

Molded Articles Formed from Glucan Dry powder with Range of additional plasticizer level at 160° C. and 200° C.

| Example | Plasticizer and Amount | Formation |
| --- | --- | --- |
| 10A-1 | Water (10%) | O |
| 10B-1 | Water (20%) | O |
| 10C-1 | Water (30%) | R |
| 10D-1 | Water (40%) | R |
| 10E-1 | Water (50%) | R |

For Example 10, for each combination of plasticizer and dry poly alpha-1,3-glucan powder, the formation results were the same at 160° C. and at 200° C.

Example 11

TABLE 12

Molded Articles Formed Using Mixture of Plasticizers at 160° C.

| Example | Polysaccharide (with plasticizer and amount, if used) | Formation |
| --- | --- | --- |
| 11A | Glucan Dry Powder (no plasticizer added) | O |
| 11B | Glucan Wet cake (no plasticizer added) | R |
| 11C | Glucan Dry powder (with 30% water and 30% glycerol added) | O |
| 11D | Glucan Wet cake (with 30% glycerol added) | R |

As a summary of conditions that formed objects or ruptured samples under the process conditions used, poly alpha-1,3-glucan as dry powder, poly alpha-1,3-glucan as wet cake, and dextran-poly alpha-1,3-glucan graft copolymers formed objects without additional plasticizer (note that all the polysaccharide samples contained at least 10 wt % water). Plasticizers were screened using poly alpha-1,3-glucan as dry powder. The plasticizers listed in Table 4 were useful in forming molded objects at a range of weight percentages.

Figure 2:
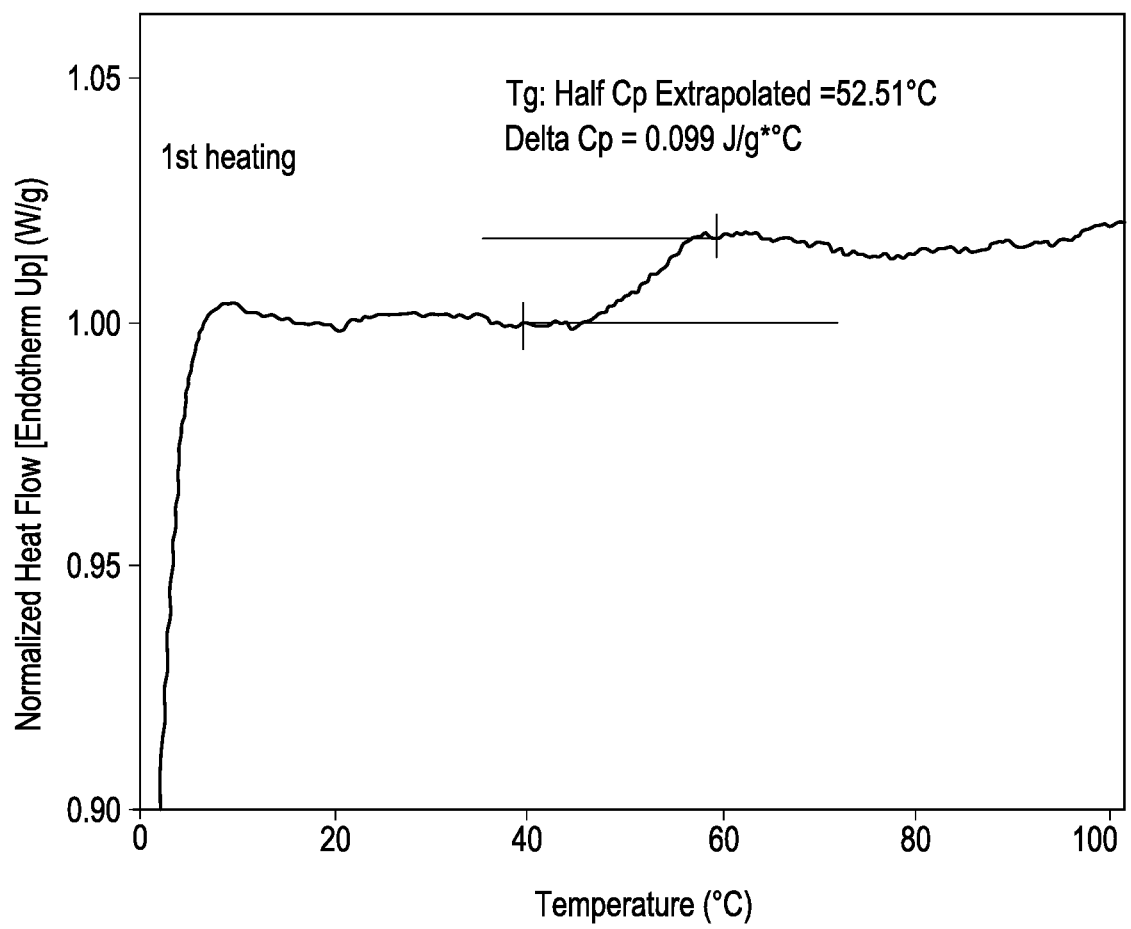
FIG. 2 is a representation of the differential scanning calorimetry (DSC) first heating scan of poly alpha-1,3-glucan dry powder (Example 1A).

FIG. 1 shows the X-ray diffractograms of glucan before and after molding dry glucan at 180° C. (Example 6B) or 200° C. (Example 6C). As indicated in Table 1 and Table 7, the glucan forms an object at 160° C., 180° C., and 200° C. The crystal form is maintained. Molding was possible by maintaining glucan as the structural material by utilizing amorphous regions to form plaque objects, leaving crystallites intact. FIG. 2 shows the differential scanning calorimetry (DSC) first heating scan of poly alpha-1,3-glucan dry powder (Example 1A) and indicates a Tg at 53° C. supporting the formation by utilizing amorphous glucan.

Figure 3:
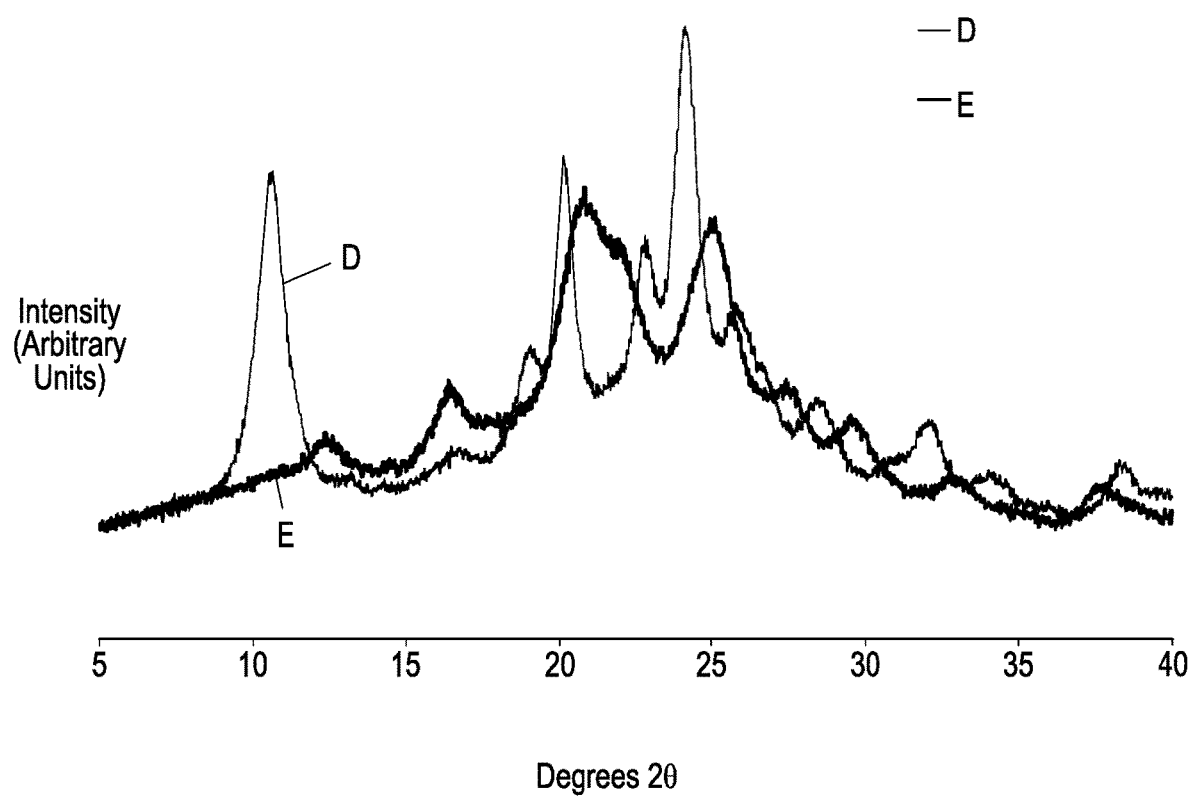
FIG. 3 is a representation of the X-ray diffractograms of poly alpha-1,3-glucan dry powder combined with glycerol before and after molding. (Example 7A). Line D shows data for the mixture before molding; Line E shows data for the molded article.

Further addition of plasticizer shows the change of crystallinity. An overlay of the X-ray diffractograms of poly alpha-1,3-glucan dry powder combined with glycerol before and after molding (Example 7A) is shown in FIG. 3.

In summary, it has been demonstrated that molded objects can be prepared by using poly alpha-1,3-glucan as the structural material and by utilizing amorphous regions to form molded objects, leaving crystallites intact. In addition, it was demonstrated that the crystallites could be disrupted to form molded objects.

What is claimed is:

1. A compression-molded article that
   (i) consists essentially of poly alpha-1,3-glucan, optionally wherein the molded article further comprises starch and/or a plasticizer;
   (ii) comprises a graft copolymer that comprises:
      (A) a backbone comprising dextran with a weight-average molecular weight of at least about 100000 Daltons, and
      (B) poly alpha-1,3-glucan side chains comprising at least about 95% alpha-1,3-glucosidic linkages;
   or
   (iii) comprises a poly alpha-1,3-glucan ester compound represented by Structure I:

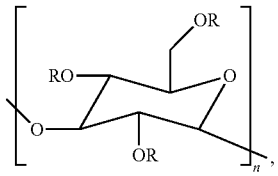

wherein
   (A) n is at least 6,
   (B) each R is independently an —H or a first group comprising —CO—$C_x$—COON, wherein the —$C_x$— portion of said first group comprises a chain of 2 to 18 carbon atoms, and
   (C) the poly alpha-1,3-glucan ester compound has a degree of substitution with the first group of about 0.001 to about 1.5;
wherein the compression-molded article is produced by a process that comprises compressing a powder of the poly alpha-1,3-glucan, graft copolymer, or poly alpha-1,3-glucan ester compound.

2. The compression-molded article of claim 1, that (i) consists essentially of the poly alpha-1,3-glucan and optionally further comprises the starch and/or the plasticizer.

3. The compression-molded article of claim 2, wherein the percentage of glycosidic linkages between the glucose monomer units of the poly alpha-1,3-glucan that are alpha-1,3 is greater than or equal to 50%.

4. The compression-molded article of claim 2, wherein the molded article comprises the plasticizer.

5. The compression molded article of claim 4, wherein the plasticizer comprises glycerol and/or water.

6. The compression molded article of claim 2, wherein the poly alpha-1,3-glucan is in fibrid form.

7. The compression molded article of claim 2, wherein the powder of the poly alpha-1,3-glucan has less than 15 weight percent of water.

8. The compression-molded article of claim 1, that (ii) comprises the graft copolymer.

9. The compression-molded article of claim 1, that (iii) comprises the poly alpha-1,3-glucan ester compound.

10. The compression-molded article of claim 1, wherein the compression-molded article comprises about 60 weight percent to about 100 weight percent of the poly alpha-1,3-glucan, the graft copolymer, or the poly alpha-1,3-glucan ester compound.

11. The compression-molded article of claim 1, further comprising starch.

12. The compression-molded article of claim 1, further comprising a plasticizer.

13. The compression-molded article of claim 12, wherein the compression-molded article comprises about 1 weight percent to about 60 weight percent of the plasticizer.

14. The compression-molded article of claim 12, wherein the plasticizer comprises fructose, sorbitol, sucrose, glycerol, polyethylene glycol having a number average molecular weight of about 100 to about 2000 g/mole, triethylene glycol, methyl lactate, ethyl lactate, sodium lactate, inulin, diglycerol, triglycerol, maltodextrin 6, propylene glycol, propylene carbonate, dimethyl ether isosorbide, methyl levulinate, methyl urea, gamma-valerolactone, triethyl citrate, glycerol monoacetate, glycerol diacetate, glycerol triacetate, water, or a combination thereof.

15. The compression-molded article of claim 12, further comprising starch.

16. The compression-molded article of claim 1, further comprising carbon black and/or inorganic particles selected from titanium dioxide, calcium carbonate, mica, vermiculite, silica, kaolin, talc, or a mixture thereof.

17. The compression-molded article of claim 1, wherein the compression-molded article is a container, handle, packaging, tray, bottle, cup, sheet, disposable food packaging item, automotive part, casing, or toy.

18. A compression molding process for making a compression-molded article, the process comprising:
   (a) combining a polysaccharide in the form of a powder and a plasticizer, and optionally starch, to form a mixture, and
   (b) heating the mixture to a temperature of about 140° C. to about 220° C. while applying a pressure of about 0.5 MPa to about 25 MPa;
   wherein the polysaccharide comprises
      (i) that consists essentially of poly alpha-1,3-glucan and optionally further comprising starch;
      (ii) a graft copolymer that comprises:
         (A) a backbone comprising dextran with a weight-average molecular weight of at least about 100000 Daltons, and (B) a poly alpha-1,3-glucan side chains comprising at least about 95% alpha-1,3-glucosidic linkages;
or
(iii) a poly alpha-1,3-glucan ester compound represented by Structure I:

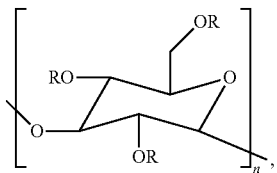

wherein
(A) n is at least 6,
(B) each R is independently an —H or a first group comprising —CO—$C_x$—COOH, wherein the —$C_x$— portion of said first group comprises a chain of 2 to 18 carbon atoms, and
(C) the poly alpha-1,3-glucan ester compound has a degree of substitution with the first group of about 0.001 to about 1.5.

19. The compression molding process of claim 18, wherein the polysaccharide comprises the poly alpha-1,3-glucan.

20. The compression molding process of claim 19, wherein the percentage of glycosidic linkages between the glucose monomer units of the poly alpha-1,3-glucan that are alpha-1,3 is greater than or equal to 50%.

* * * * *